US008195106B2

(12) United States Patent
Jung et al.

(10) Patent No.: US 8,195,106 B2
(45) Date of Patent: Jun. 5, 2012

(54) VEHICLE CONTROL AND COMMUNICATION VIA DEVICE IN PROXIMITY

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US);
Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1378 days.

(21) Appl. No.: 11/645,138

(22) Filed: Dec. 21, 2006

(65) Prior Publication Data

US 2007/0279241 A1 Dec. 6, 2007

Related U.S. Application Data

(63) Continuation-in-part of application No. 11/444,973, filed on May 31, 2006.

(51) Int. Cl.
*H01Q 11/12* (2006.01)

(52) U.S. Cl. ....... 455/126; 340/3.1; 340/3.32; 340/5.26; 340/5.63; 340/5.61; 701/1; 701/2; 219/243; 398/106; 345/161; 345/173

(58) Field of Classification Search ............. 455/420, 455/126; 700/83; 340/5.26, 5.61, 5.72, 7.2, 340/426.13, 426.25, 426.17, 447, 825.69, 340/3.1, 3.32, 5.63; 342/357.31, 357.07, 342/357.13; 701/1, 2, 36, 49, 201, 210; 702/188
See application file for complete search history.

(56) References Cited

U.S. PATENT DOCUMENTS

| 4,922,443 | A | * | 5/1990 | Coetsier et al. ............... 702/188 |
| 5,612,669 | A | * | 3/1997 | Allen et al. ............. 340/426.25 |
| 5,648,897 | A | * | 7/1997 | Johnson et al. ................. 700/83 |
| 5,654,688 | A | * | 8/1997 | Allen et al. ............. 340/426.17 |
| 5,663,704 | A | * | 9/1997 | Allen et al. ............. 340/426.25 |
| 5,729,191 | A | * | 3/1998 | Allen et al. ............. 340/426.17 |
| 5,805,672 | A |   | 9/1998 | Barkat et al. |
| 5,818,329 | A | * | 10/1998 | Allen ....................... 340/426.17 |
| 5,898,400 | A | * | 4/1999 | Jones et al. .................. 342/104 |
| 5,940,007 | A | * | 8/1999 | Brinkmeyer et al. .... 340/825.69 |
| 5,982,277 | A | * | 11/1999 | Flick ........................... 340/5.21 |
| 6,083,104 | A | * | 7/2000 | Choi ................................ 463/6 |
| 6,130,606 | A | * | 10/2000 | Flick ........................ 340/426.14 |
| 6,182,006 | B1 | * | 1/2001 | Meek .......................... 701/200 |
| 6,184,780 | B1 | * | 2/2001 | Allen et al. ................ 340/426.3 |
| 6,259,362 | B1 | * | 7/2001 | Lin ............................... 340/457 |

(Continued)

OTHER PUBLICATIONS

"Applications: eCash On the Move at Volkswagen"; iButton Applications/Dallas Semiconductor MAXIM, bearing a date of 2006; pp. 1-2; printed on Feb. 27, 2006; located at: http://www.maxim-ic.com/products/ibutton/applications/index.cfm?Action=DD&id=21; Maxim Integrated Products.

(Continued)

*Primary Examiner* — William D Cumming

(57) ABSTRACT

An apparatus, device, methods, computer program product, and system are described that make a determination that a first device associated with a vehicle is in proximity to a wireless device, transmit a signal from the first device to the wireless device to cause the wireless device to display information related to the vehicle, and perform an operation with respect to the vehicle based at least in part on the determination.

35 Claims, 26 Drawing Sheets

U.S. PATENT DOCUMENTS

| | | | |
|---|---|---|---|
| 6,366,198 B1* | 4/2002 | Allen et al. | 340/426.17 |
| 6,377,825 B1 | 4/2002 | Kennedy et al. | |
| 6,480,098 B2* | 11/2002 | Flick | 340/7.2 |
| 6,526,335 B1* | 2/2003 | Treyz et al. | 701/1 |
| 6,535,116 B1* | 3/2003 | Zhou | 340/447 |
| 6,556,899 B1* | 4/2003 | Harvey et al. | 701/29 |
| 6,611,739 B1* | 8/2003 | Harvey et al. | 701/29 |
| 6,621,452 B2* | 9/2003 | Knockeart et al. | 342/357.31 |
| 6,628,233 B2* | 9/2003 | Knockeart et al. | 342/357.31 |
| 6,639,550 B2* | 10/2003 | Knockeart et al. | 342/357.31 |
| 6,647,328 B2* | 11/2003 | Walker | 701/36 |
| 6,664,924 B2* | 12/2003 | Knockeart et al. | 342/357.31 |
| 6,680,694 B1* | 1/2004 | Knockeart et al. | 342/357.31 |
| 6,681,174 B1* | 1/2004 | Harvey et al. | 701/117 |
| 6,707,421 B1* | 3/2004 | Drury et al. | 342/357.31 |
| 6,711,474 B1* | 3/2004 | Treyz et al. | 701/1 |
| 6,784,832 B2* | 8/2004 | Knockeart et al. | 342/357.31 |
| 6,812,888 B2* | 11/2004 | Drury et al. | 342/357.31 |
| 6,909,398 B2* | 6/2005 | Knockeart et al. | 342/357.31 |
| 6,919,792 B1 | 7/2005 | Battini et al. | |
| 6,968,272 B2* | 11/2005 | Knockeart et al. | 701/210 |
| 6,970,783 B2* | 11/2005 | Knockeart et al. | 701/201 |
| 6,980,092 B2* | 12/2005 | Turnbull et al. | 340/425.5 |
| 7,023,379 B2* | 4/2006 | Turnbull | 342/357.75 |
| 7,036,076 B2 | 4/2006 | Anwar | |
| 7,068,163 B2 | 6/2006 | Sari et al. | |
| 7,103,556 B2 | 9/2006 | Del Rey et al. | |
| 7,107,081 B1 | 9/2006 | Fujisaki | |
| 7,135,962 B2* | 11/2006 | Durbin et al. | 340/425.5 |
| 7,142,096 B2 | 11/2006 | Eisenman | |
| 7,155,674 B2 | 12/2006 | Breen et al. | |
| 7,158,006 B2* | 1/2007 | Lee et al. | 340/5.61 |
| 7,200,801 B2 | 4/2007 | Agassi et al. | |
| 7,224,262 B2* | 5/2007 | Simon et al. | 340/426.13 |
| 7,231,496 B2 | 6/2007 | Curtis | |
| 7,240,067 B2 | 7/2007 | Timmons | |
| 7,245,258 B2 | 7/2007 | Velhal et al. | |
| 7,259,357 B2* | 8/2007 | Walker | 219/243 |
| 7,293,034 B2 | 11/2007 | Paya et al. | |
| 7,298,246 B1* | 11/2007 | Schmitt | 340/426.1 |
| 7,327,226 B2* | 2/2008 | Turnbull et al. | 340/425.5 |
| 7,332,998 B2* | 2/2008 | Beehler et al. | 340/5.63 |
| 7,548,697 B2* | 6/2009 | Hudson et al. | 398/106 |
| 7,643,913 B2* | 1/2010 | Taki et al. | 701/2 |
| 7,725,077 B2 | 5/2010 | Jung et al. | |
| 2001/0050611 A1 | 12/2001 | Achterholt et al. | |
| 2001/0052858 A1 | 12/2001 | Vincent et al. | |
| 2002/0032510 A1* | 3/2002 | Turnbull et al. | 701/49 |
| 2002/0084893 A1 | 7/2002 | Eisenman | |
| 2002/0130765 A1* | 9/2002 | Flick | 340/7.2 |
| 2002/0137505 A1 | 9/2002 | Eiche et al. | |
| 2003/0018428 A1* | 1/2003 | Knockeart et al. | 701/210 |
| 2003/0055542 A1* | 3/2003 | Knockeart et al. | 701/26 |
| 2003/0055553 A1* | 3/2003 | Knockeart et al. | 701/120 |
| 2003/0055555 A1* | 3/2003 | Knockeart et al. | 701/202 |
| 2003/0067541 A1* | 4/2003 | Joao | 348/148 |
| 2003/0193404 A1* | 10/2003 | Joao | 340/825.71 |
| 2003/0206102 A1* | 11/2003 | Joao | 340/539.1 |
| 2004/0049324 A1* | 3/2004 | Walker | 701/1 |
| 2004/0049336 A1* | 3/2004 | Knockeart et al. | 701/201 |
| 2004/0049337 A1* | 3/2004 | Knockeart et al. | 701/201 |
| 2004/0056797 A1* | 3/2004 | Knockeart et al. | 342/357.13 |
| 2004/0064245 A1* | 4/2004 | Knockeart et al. | 701/117 |
| 2004/0066330 A1* | 4/2004 | Knockeart et al. | 342/357.07 |
| 2004/0104842 A1* | 6/2004 | Drury et al. | 342/357.13 |
| 2004/0107144 A1 | 6/2004 | Short | |
| 2004/0179545 A1 | 9/2004 | Erola et al. | |
| 2004/0183676 A1 | 9/2004 | Eisenman | |
| 2004/0196179 A1* | 10/2004 | Turnbull | 342/357.06 |
| 2005/0064814 A1 | 3/2005 | Matsuo et al. | |
| 2005/0073388 A1* | 4/2005 | Lee et al. | 340/5.1 |
| 2005/0088280 A1* | 4/2005 | Beehler et al. | 340/5.62 |
| 2005/0168071 A1* | 8/2005 | Durbin et al. | 307/10.1 |
| 2005/0203752 A1* | 9/2005 | Shinada | 705/1 |
| 2006/0061458 A1* | 3/2006 | Simon et al. | 340/426.35 |
| 2006/0097855 A1* | 5/2006 | Turnbull et al. | 340/425.5 |
| 2006/0214813 A1* | 9/2006 | Witkowski et al. | 340/825.69 |
| 2006/0226949 A1* | 10/2006 | Reene | 340/5.25 |
| 2006/0232377 A1* | 10/2006 | Witkowski | 340/5.25 |
| 2006/0261931 A1* | 11/2006 | Cheng | 340/426.1 |
| 2007/0008189 A1* | 1/2007 | Amari et al. | 340/995.19 |
| 2007/0027595 A1* | 2/2007 | Nou | 701/36 |
| 2007/0032225 A1 | 2/2007 | Konicek et al. | |
| 2007/0152798 A1* | 7/2007 | Witkowski | 340/5.26 |
| 2007/0176736 A1* | 8/2007 | Chuey et al. | 340/5.61 |
| 2007/0197172 A1* | 8/2007 | Witkowski et al. | 455/126 |
| 2007/0224937 A1 | 9/2007 | Jung et al. | |
| 2007/0224938 A1 | 9/2007 | Jung et al. | |
| 2008/0027590 A1* | 1/2008 | Phillips et al. | 701/2 |
| 2008/0063400 A1* | 3/2008 | Hudson et al. | 398/106 |
| 2008/0065274 A1* | 3/2008 | Taki et al. | 701/2 |
| 2008/0068205 A1* | 3/2008 | Witkowski | 340/825.22 |
| 2008/0086241 A1* | 4/2008 | Phillips et al. | 701/2 |
| 2008/0091309 A1* | 4/2008 | Walker | 701/1 |
| 2008/0103640 A1* | 5/2008 | Watanabe et al. | 701/2 |
| 2008/0103655 A1* | 5/2008 | Turnbull et al. | 701/33 |
| 2008/0129449 A1* | 6/2008 | Beehler et al. | 340/5.72 |
| 2008/0143686 A1* | 6/2008 | Yeh et al. | 345/173 |
| 2008/0164972 A1* | 7/2008 | Taki et al. | 340/3.1 |
| 2008/0183376 A1* | 7/2008 | Knockeart et al. | 701/119 |
| 2008/0266254 A1* | 10/2008 | Robbins et al. | 345/161 |
| 2008/0309451 A1* | 12/2008 | Zellweger et al. | 340/3.32 |
| 2009/0037033 A1* | 2/2009 | Phillips et al. | 701/2 |

OTHER PUBLICATIONS

"Applications: "Mass Transit in Istanbul, Turkey" and "Parking in Argentina""; iButton Applications/Dallas Semiconductor MAXIM; bearing a date of 2006; pp. 1-3; printed on Feb. 27, 2006; located at http://www.maxim-ic.com/products/ibutton/applications/index.cfm?Action=DD&id=8; Maxim Integrated Products.

"Applications: Secure Website Logon and Transactions"; iButton Applications; Bearing a date of 2004; pp. 1-2; printed on Mar. 3, 2006; located at: http://72.14.207.104/search?q=cache:4JM396tN_ToJ:db.maxim-ic.com/ibutton/applications/index.cfm; Maxim/Dallas Semiconductor Corp.

"Cellport Announces First Universal, Hands-Free Cell Phone System for Cars"; Intelligent Transportation Society of America; bearing a date of Jul. 16, 2001; pp. 1-2; printed on Feb. 24, 2006; located at: http://www.itsa.org/itsnew.nsf/key/5FAA?OpenDocument; Intelligent Transportation Society of America.

"City of Caen, France, to demonstrate simplicity of Near Field Communication (NFC) technology"; bearing dates of Oct. 18, 2005 and 2004-2006; pp. 1-3; printed on Mar. 20, 2006; located at: http://www.semiconductors.philips.com/news/content/file_1193.html; Koninklijke Philips Electronics N.V.

"Ecma welcomes ISO/IEC adoption of NFC Standard for short range wireless communication"; ecma International; bearing a date of Dec. 8, 2003; printed on Feb. 24, 2006; pp. 1-3; located at: http://www.ecma-international.org/news/Ecma-340-NFCIP-1.htm.

Kiser, Kenn; "Newall Electronics Introduces Wearable DRO Technology"; Industrial Product News Online; pp. 1-2; printed on Feb. 24, 2006; located at: http://www.ipnews.com/archives/dro/jan02/newall%5Felect.htm.

Lewis, John; "Put on your human-machine interface"; Design News; bearing dates of Aug. 20, 2001 and 1997-2006; pp. 1-4; printed on Feb. 24, 2006; located at: http://designnews.com/article/CAI50040.html; Reed Business Information.

"Near Field Communication"; What You Need to Know About; bearing a date of 2006; pp. 1-3; printed on Mar. 3, 2006; located at: http://experts.about.com/e/n/ne/Near_Field_Communication.htm; About, Inc.

"Near Field Communication"; Wikipedia; bearing a date of Feb. 17, 2006; pp. 1-2; printed on Feb. 24, 2006; located at: http://en.wikipedia.org/wiki/Near_Field_Communication; Wikipedia.

"Near field communication set for full-scale trial"; Philips Semiconductors; pp. 1-3; bearing dates of Oct. 20, 2005 and 2000-2006; printed on Mar. 20, 2006; located at http://www.electronicstalk.com/news/phi/phi328.html; Pro-Talk Ltd, UK.

Oswald, Ed; "blinkx Looks to Make Search Automatic"; BetaNews; pp. 1-6; bearing dates of Mar. 7, 2006 and 1998-2006; printed on Mar.

22, 2006; pp. 1-6; located at: http://www.betanews.com/article/blinkx_Looks_to_Make_Search_Automatic/1141754474; BetaNews, Inc.

"Philips, Samsung and Telefonica Moviles Espana Demonstrate Simplicity of Near Field Communication Technology at 3GSM World Congress; 200 Attendees Can Enjoy Easy Payment and Convenient Access at Fira de Barcelona Convention Center"; Philips; bearing dates of Feb. 7, 2006 and 2006; pp. 1-4; printed on Mar. 20, 2006; located at http://home.businesswire.com/portal/site/google/index.jsp?ndmViewId=news_view&newsId=20060207005492&newsLang=en; Business Wire.

Swedberg, Claire; "Developing RFID-Enabled Phones"; RFID Journal; bearing dates of Jul. 9, 2004 and 2002-2006; pp. 1-3; printed on Mar. 20, 2006; located at http://www.rfidjournal.com/article/articleview_/1020/1/1/; RFID Journal, LLC.

Thomson, Iain; "Industry giants tout touch computing"; vnunet.com; bearing dates of Mar. 19, 2004 and 1995-2006; pp. 1-2; printed Feb. 24, 2006; located at http://www.vnunet.com/vnunet/news/2124597/industry-giants-tout-touch-computing; vnu business publications.

"Welcome"; NFC-Forum; bearing a date of 2005; pp. 1-2; printed on May 31, 2006; located at: http://www.nfc-forum.org/home; NFC Forum.

Cameron, Casey et al.; "Knuckletop Computing: The Java Ring"; bearing a date of Mar. 1998; pp. 1-4; located at: http://java.sun.com/featuses/1998/03/rings.html.

"Near Field Communication: White Paper"; ecma International; bearing a date of Dec. 2004; pp. 1-9.

U.S. Appl. No. 12/798,259, Edward K.Y. Jung.

U.S. Appl. No. 12/798,261, Edward K.Y. Jung.

\* cited by examiner

VEHICLE CONTROL AND COMMUNICATION VIA DEVICE IN PROXIMITY

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc, applications of the Related Application(s)).

RELATED APPLICATIONS

1. For purposes of the USPTO extra-statutory requirements, the present application constitutes a continuation in part of currently co-pending United States patent application entitled Wireless Device With An Aggregate User Interface For Controlling Other Devices, naming Edward K. Y. Jung, Royce A. Levien, Robert W. Lord, Mark A. Malamud, John D. Rinaldo, Jr., and Lowell L. Wood, Jr., as inventors, U.S. application Ser. No. 11/389,669, filed Mar. 24, 2006.

2. For purposes of the USPTO extra-statutory requirements, the present application constitutes a continuation in part of currently co-pending United States patent application entitled Vehicle Control and Communication Via Device in Proximity, naming Edward K. Y. Jung, Royce A. Levien, Robert W. Lord, Mark A. Malamud, John D. Rinaldo, Jr., and Lowell L. Wood, Jr., as inventors, U.S. application Ser. No. 11/414,161, filed Apr. 28, 2006, and issued as U.S. Pat. No. 7,725,077 on May 25, 2010.

3. For purposes of the USPTO extra-statutory requirements, the present application constitutes a continuation-in-part of U.S. patent application Ser. No. 11/444,973, entitled Vehicle Control and Communication Via Device in Proximity, naming Edward K.Y. Jung, Royce A. Levien, Robert W. Lord, Mark A. Malamud, John D. Rinaldo, Jr., and Lowell L. Wood, Jr., as inventors, filed May 31, 2006, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present applicant entity has provided above a specific reference to the application(s) from which priority is being claimed as recited by statute. Applicant entity understands that the statute is unambiguous in its specific reference language and does not require either a serial number or any characterization, such as "continuation" or "continuation-in-part," for claiming priority to U.S. patent applications. Notwithstanding the foregoing, applicant entity understands that the USPTO's computer programs have certain data entry requirements, and hence applicant entity is designating the present application as a continuation-in-part of its parent applications as set forth above, but expressly points out that such designations are not to be construed in any way as any type of commentary and/or admission as to whether or not the present application contains any new matter in addition to the matter of its parent application(s). All subject matter of the Related Applications and of any and all parent, grandparent, great-grandparent, etc. applications of the Related Applications is incorporated herein by reference to the extent that such subject matter is not inconsistent herewith.

SUMMARY

An embodiment provides a method. In one implementation, the method includes but is not limited to making a determination that a first device associated with a vehicle is in proximity to a wireless device, transmitting a signal from the first device to the wireless device to cause the wireless device to display information related to the vehicle, and performing an operation with respect to the vehicle based at least in part on the determination. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

An embodiment provides a computer program product. In one implementation, the computer program product includes but is not limited to a signal-bearing medium bearing at least one of one or more instructions for making a determination that a first device associated with a vehicle is in proximity to a wireless device, the signal-bearing medium bearing at least one of one or more instructions for transmitting a signal from the first device to the wireless device to cause the wireless device to display information related to the vehicle, and the signal bearing medium bearing at least one of one or more instructions for performing an operation with respect to the vehicle based at least in part on the determination. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device cause the computing device to make a determination that a first device associated with a vehicle is in proximity to a wireless device, transmit a signal from the first device to the wireless device to cause the wireless device to display information related to the vehicle, and perform an operation with respect to the vehicle based at least in part on the determination. In addition to the foregoing, other system aspects are described in the claims, drawings, and text forming a part of the present disclosure.

An embodiment provides a device. In one implementation, the device includes but is not limited to a device configured to make a determination that a first device associated with a vehicle is in proximity to a wireless device, a signal configured to be transmitted from the first device to the wireless device to cause the wireless device to display information related to the vehicle, and an operation configured to be performed with respect to the vehicle based at least in part on the determination. In addition to the foregoing, other device aspects are described in the claims, drawings, and text forming a part of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE DRAWINGS

The use of the same symbols in different drawings typically indicates similar or identical items.

DETAILED DESCRIPTION

Figure 1:
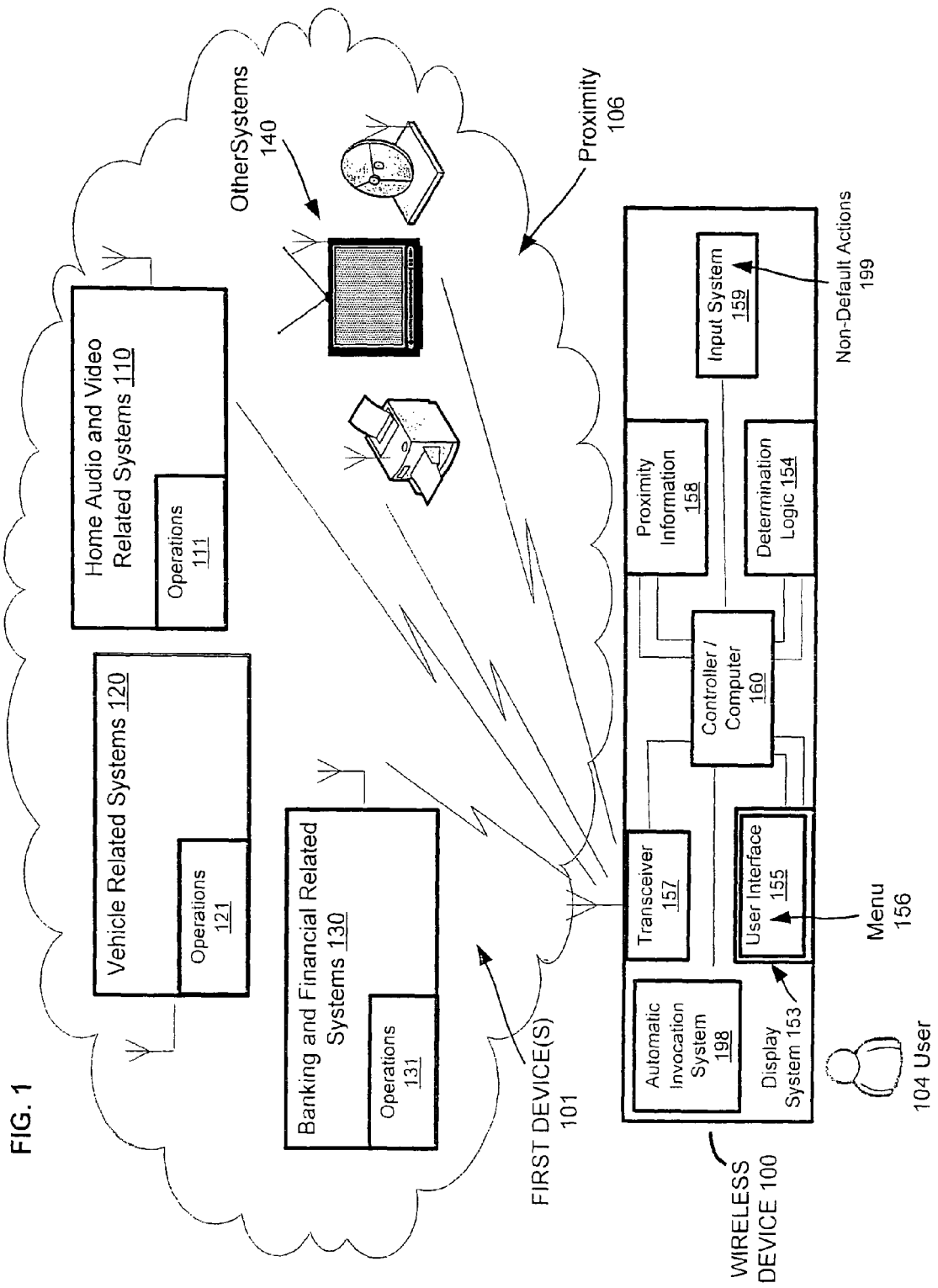
FIG. 1 illustrates an example of vehicle control and communication via a device in proximity in which embodiments may be implemented, perhaps in a device.

FIG. 1 illustrates an example wireless device 100 in which embodiments may be implemented. A wireless device 100 may include a display system 153 for displaying a variety of information, such as a user interface 155, which may include a menu 156. Wireless device 100 may also include a controller 160 for providing overall control of wireless device 100, a (wireless) transceiver 157 to transmit (send) and receive signals, determination logic 154 for making various determinations, and automatic invocation system 198 for automatically invoking "default" operations with minimal or, in some cases, no user interaction, for example. Controller 160 may be, for example, a programmed controller or microprocessor, and may include hardware, software, and/or a combination of hardware and software, for example. Controller 160 may include, for example, a processor, memory, input and output, and other hardware, software, and/or firmware generally associated with a general purpose computing device. An input system 159 may include a keyboard, keypad, pointing device (e.g., mouse, pointing stick), biometric identifier, button, toggle switch, or other input device that, for example, may be used by a user to input information to wireless device 100. Input System 159 may include non-default actions 199 which may be, for example, button or key presses, or the like that may be used to indicate that a non-default action should be invoked.

Wireless device 100 may also include or store proximity information 158 relating to one or more first devices 101. Proximity information 158 may provide, for example, information relating to a location or closeness or proximity of one or more first devices 101 to the wireless device 100. For example, proximity information 158 may identify a location of each of the first devices 101, identify a distance (e.g., from wireless device 100) to one of first devices 101, or may provide a list of which devices are in proximity (e.g., near or within a predetermined distance) to wireless device 100, and/or may identify which of the first devices 101 are closest to wireless device 100, identify one of the first devices 101 that has been touched by wireless device 100, etc.

Wireless device 100 may be in proximity to or near one or more first devices 101. First devices 101 may include, for example, home audio and video related systems 110, vehicle related systems 120, banking and financial related systems 130, and other systems 140 (in some implementations, banking and financial related systems, and other systems 104, may be integrated into and/or with one or more vehicles). Other systems 140 may include a variety of other example wireless devices, such as a printer, television, and satellite receiver, shown here, as well as other devices such as a camera, personal computer, photo frame, personal digital assistant (PDA), or any number of first devices that may establish a wireless network connection or link with another device. Each of the first devices 101 may include a controller, a wireless transceiver, automatic invocation systems, determination or other logic, etc., as shown for wireless device 100. Each of the first devices 101 may include one or more operations 111, 121, and 111, which may be performed on or with respect to such first devices 101, and such operations are not shown with respect to other systems 140, but they are included in those systems as well.

First devices 101 shown in FIG. 1 provide several examples of devices but it is not an exhaustive list, and may also include any device or part of a device with a wireless capability (e.g., including a vehicle or car itself, or a part of the vehicle, for example). Each of the first devices may be a wireless device. Alternatively, each of the first devices 101 may not be "wireless" or "wireless capable", but may operate or work though an intermediary wireless device (not shown) in order to communicate wirelessly with wireless device 100.

The wireless device 100 may be controlled by a user 104, for instance, to control one or more of the first devices 101, which are in proximity 106 to wireless device 100 or nearby wireless device 100. According to an example embodiment, proximity 106 may refer to an area that is near or in proximity to wireless device 100. Thus, the various first devices 101 may be in proximity or near wireless device 100.

In operation, the wireless device 100 may be used, for example, to control one or more first devices 101 using a variety of different techniques. When a first device is within proximity 106 or near wireless device 100, wireless device 100 may establish a wireless link or wireless network connection with the first device, e.g., via (wireless) transceiver 157. For example, by establishing a wireless link and communicating information with a first device, wireless device 100 may determine or make a determination that the first device is in proximity to wireless device 100. Alternatively, wireless device 100 may determine that a first device is in proximity to wireless device 100 based on a touching or contact between the device 100 and the first device 101 (e.g., wireless device 100 touches a "hot spot" or designated area for the first device). Similarly, a first device 101 may determine that it is in proximity or near to wireless device 100, e.g., either through a wireless communication link that is established with wireless device 100 and/or via contact to wireless device 100, for example.

According to an example embodiment, one of the first devices 101 and the wireless device 100 may establish a wireless connection or wireless link and may exchange data when the two devices are near each other or within a maximum distance, e.g., when the first device is within proximity 106 or near wireless device 100. For example, when a user carrying wireless device 100 (or other device) moves toward the area generally indicated as proximity 106 in FIG. 1, he begins to make closure with (or move nearer to) the proximity 106. At this point the wireless device 100, the first devices 101, or a combination of both may make a determination that the wireless device 100 is in proximity to one or more of the first devices 101.

Once one or more of the first devices 101 are in proximity (e.g., near or touching) to wireless device 100, a wireless connection or link may be established, for instance using transceiver 157 and similar transceivers on the first devices 101. A variety of information may then be exchanged between the devices, and one or more actions or operations may be performed on the wireless device 100, e.g., either as default actions (via automatic invocation system 198), or as non-default actions 199 upon a user selection, for instance.

According to an example embodiment, wireless device 100 may determine a user interface 155, e.g., based on a determination that one or more first devices 101 are in proximity or near wireless device 100 or based on a determination that one or more of the first devices 101 have operations that are of particular use to the user 104, or both, as examples. In an example embodiment, the user interface 155 may be provided or displayed on display system 153 of wireless device 100, for example.

The user interface 155 may, for example, be a user interface that may provide an aggregate or cumulative interface providing one or more information elements related to one or more devices. For example, the user interface may include a list of operations associated with one or more devices that may be in proximity to wireless device 100, or a menu 156 of elements or operations for each of a plurality of first devices 101 in proximity. The user interface 155 may change or be updated based on changing environment, e.g., a new set of operations displayed as new wireless devices come into proximity, etc. The user interface 155 may be continually updated by sorting a list of first devices 101 in proximity 106, e.g., ordered by distance and changing the output to display system 153. This updating of the user interface 155 may be performed, for example, in part using determination logic 154 and controller 160, along with proximity information 115 associated with each first device. However, user interface 155 may also be centrally determined, or determined by an "observer" component (not shown) removed from the wireless device 100, or alternatively on one or more of the first devices 101.

A number of examples will now be provided, and these are only illustrative and the embodiments are not limited thereto. In one example, the user 104 may carry wireless device 100 and move toward a camera in the area generally indicated as proximity 106 (being in proximity to various first devices 101), the camera having a particular photo or image displayed thereon. In an example, if the user 104 is holding a wireless device 100 comprising a cellular phone with a particular contact selected, automatic invocation system 198 of the camera may send or wirelessly transmit the photo to the cellular phone, where the photo may be stored with or associated with the contact on the cellular phone. For example, this may be done automatically, e.g., without direct interaction from the user 104 other than to move toward one of the first devices 101 in the above-described state.

In another example, the user 104 with a PDA type wireless device 100 may move toward a printer in other systems 140, in the area generally indicated as proximity 106 (thus, the two devices are in proximity). The printer may detect the PDA wireless device and determine that the devices are in proximity (e.g., wireless detection or contact) and may print a document displayed on the PDA. Alternatively, or in addition, a user 104 may use the input system 159 to provide additional input, e.g., by tapping on input system 159, or selecting a key, or by reorienting the wireless device 100 (e.g., PDA in this example) to present a print dialog on the PDA or select a specific action to be performed.

When an MP3 player style wireless device 100 is brought into proximity 106 with a PC in first devices 101, a menu 156 may be presented on the MP3 player with options, for example, to sync, begin playing the current song on the PC, transfer the user interface of the MP3 player (in its current state) to the PC. After a brief pause (if none of these is explicitly selected) automatic invocation system 198 may cause the MP3 player to stop playing and have the PC take over playing the current song.

Tapping, gesturing, or reorienting a camera style wireless device 100 when it is in proximity 106 to a digital photo frame in first devices 101 may cause automatic invocation system 198 to put a suitably transformed, current viewfinder image to the photo frame. Double tapping, represented by non-default actions 199, may be used to put the entire contents of the camera, a slideshow, and/or a menu 156 of transition effects choices on the camera style wireless device 100.

Another example may occur when the user 104 is carrying wireless device 100 and moves toward the area generally indicated as proximity 106. Automatic invocation system 198 may cause the display system 153 to present a menu 156 of operations supported by one or more of the first devices 101 that are in proximity 106. The menu 156 may be used to operate the first devices 101. For example, each of the first devices 101 are indicated as having operations 111, 121, and 131 that may be performed on them. The menu 156 may be a list of these operations and selecting one of them sends a command to the first devices 101 and causes one of the first devices 101 to otherwise execute the command.

Another example occurs when the user 104 is carrying wireless device 100 and moves toward the area generally indicated as proximity 106. The wireless device 100 automatically connects to a DVD in home audio and video related systems 110 and then to a CD player in home audio and video related systems 110 and then to a game system, such as an Xbox or Playstation, which may be used to determine and/or provide a user interface 155 presenting a collected user interface for all the devices in home audio and video related systems 110. The user interface 155 may then be used to operate all of the devices in home audio and video related systems 110. For example, a menu 156 may be provided with a "Play" operation 111 with a submenu "Play Music, Play DVD" each of which has submenus, (i.e., On Xbox, On CD player). This user interface 155 and/or menu 156 may also vanish or disappear from display system 153 after a fixed time unless the user 104 asks to keep it, for example.

If the wireless device 100 is in proximity 106 to a TV in other systems 140, automatic invocation system 198 may be used to turn on to the show that user 104 has scheduled in his calendar for this time. If no default action is available (i.e., the user 104 has no calendar entry), the viewing history or preferences of the user 104 may be used to select a channel, if viewing history and/or preferences cannot be used, the system may turn on the TV as usual. Alternatively, if user 104 has a web browser application executing on the wireless device 100 and the web browser is pointed to the URL "http://www.cnn.com/, for example, the TV may be tuned to CNN as well.

In another example, the user 104 moves toward proximity 106 with a plurality of first devices 101. If, for example, the user 104 uses the non-default actions 199 of input system 159 to activate an "available actions" button, a list of the first devices 101 present their operations to wireless device 100 at display system 153.

First devices 101 may also indicate what direction user 104 needs to walk to approach a particular device, using at least proximity information 158. As the user 104 gets closer to some and farther from others of the first devices 101 and their operations 111, 121, and 131 reorder themselves on the user interface 155, e.g., closest devices at the top, until the user 104 get very close at which point the options for only one (the closest) of the first devices 101 is presented on the user interface 155 on display system 153. Thus, the user interface 155 may be continually updated using at least determination logic 154 and proximity information 158 in wireless device 100. Finally, a user 104 of the device 100 may cause to invoke a default or non-default action (for instance by gesturing, tilting the wireless device, or otherwise indicating a default or non-default action should occur depending on the operations available).

In another example, the wireless device 100 may make a determination about the locations of the first devices 101. The locations may be communicated, e.g., from the first devices 101, to a central device (not shown) that may compute proximities and transmit to the wireless device 100, or also to one or more of the first devices 101. One or more of the first devices 101 may also use the location of the wireless device 100 to transmit its proximity 106 or location to it. In this example, the first devices 101 might not transmit proximity 106 or location information at all, but instead decide for itself what commands, it wants to transmit to the wireless device 100. Alternatively, some first devices 101 might, in addition to transmitting enough location information for the wireless device 100 to determine proximity 106, also transmit specific information (such as subsets of options or commands) based on the determination of proximity 106 from the first devices 101.

Figure 2:
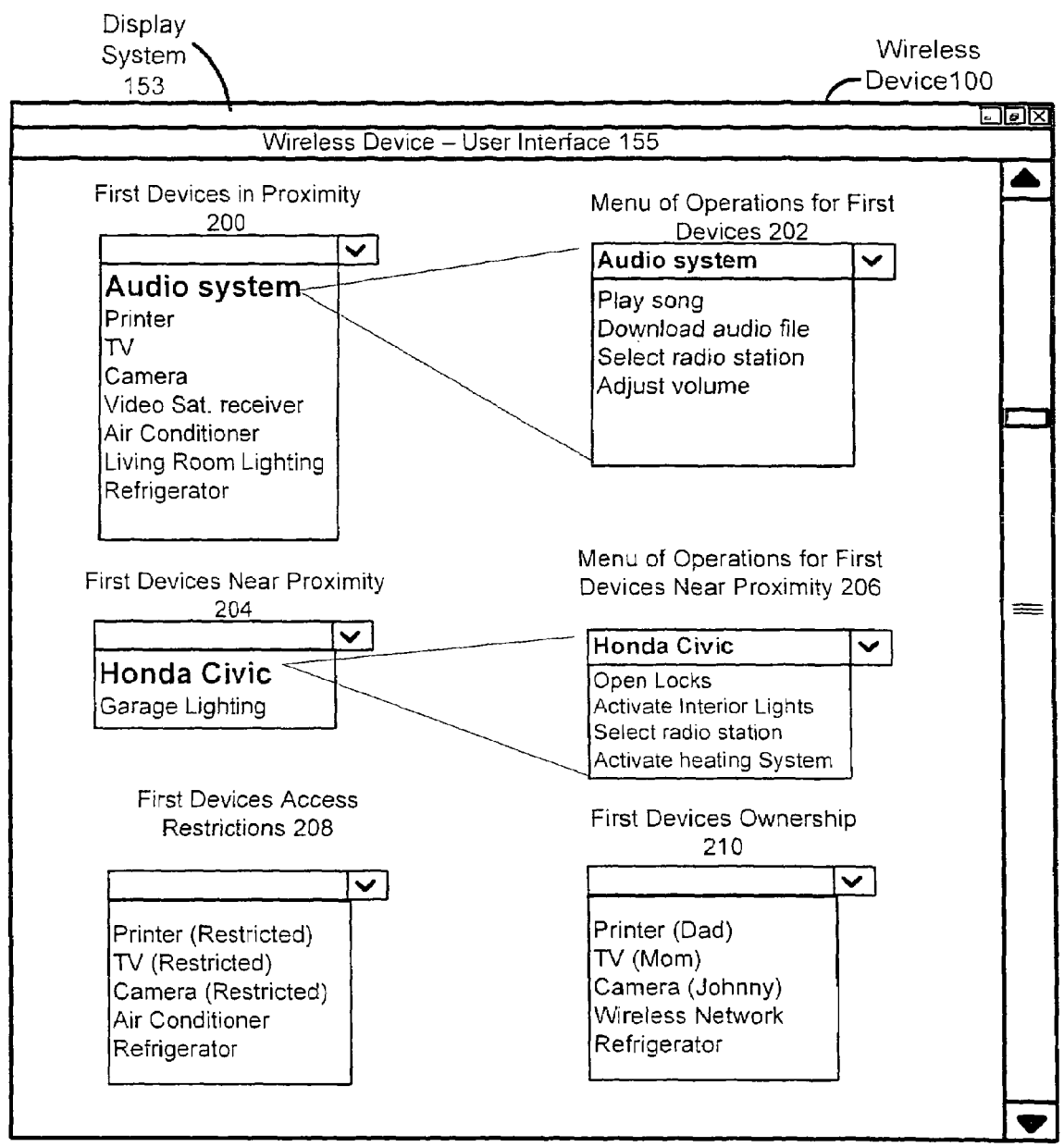
FIG. 2 illustrates certain alternative embodiments of the vehicle control and communication via a device in proximity of FIG. 1.

FIG. 2 illustrates certain alternative embodiments of the wireless device 100 of FIG. 1. FIG. 2 illustrates a wireless device 100, including a display system 153, a user interface 155, and a plurality of menus 200, 202, 204, 206, 208, and 210. Menus 200-210 may correspond, for instance to menu 156 of FIG. 1.

Menu 200 comprises a list of the first devices 101 that are in proximity with wireless device 100. In this example that includes an audio system, a printer, a TV, a camera, a video satellite receiver, an air conditioner, the living room lighting, and a refrigerator. In this example, the audio system is the closest one of the first devices 101, so its operations are shown in menu 202, which include in this example, "play song", "download audio file", "select radio station", and "adjust volume".

Menus 204 and 206 are also shown on the user interface 155. Menu 204 includes the first devices 101 that are near but not yet in proximity 106 with a user's wireless device 100. In this example, the user 104 is walking toward a garage. As the user 104 walks, the garage lighting and the user's Honda Civic are nearly in proximity 106, and represent first devices 101 that will soon probably be available and within proximity 106. The garage lighting and Honda Civic are listed in menu 204. The closest, default, and/or first device 101 deemed relatively important is listed in menu 206, which is the user's Honda Civic. The user's behavior patterns may have indicated to the wireless device 100 that the Honda Civic is relatively important, or the user may have specified that information explicitly to wireless device 100, or alternatively menu 206 may be based on proximity 106, by listing the deemed closest first device 101 as in menu 202.

Menu 208 gives an example of a list that may form part of the user interface 155, showing the access restrictions for devices that are in proximity 106. In this case, the printer, TV, and camera are restricted, while the air conditioner and refrigerator are available for use. Menu 210 shows first device ownership. In menu 210, Dad owns the printer and mom owns the TV. The camera is owned by Johnny, and the wireless network and refrigerator have unspecified ownership and/or are deemed to be owned by anyone capable of establishing a connection with them using a wireless device 100.

Figure 3:
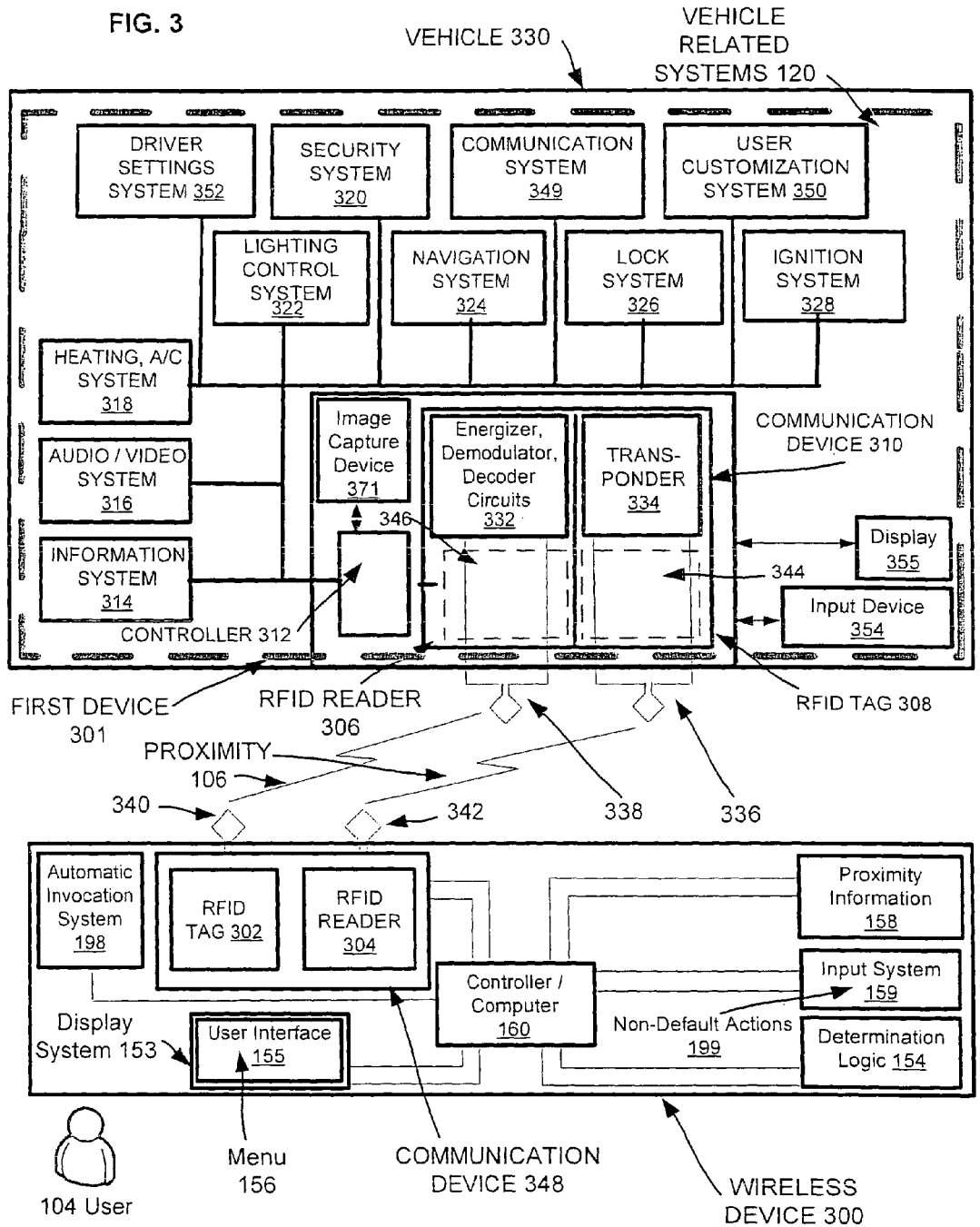
FIG. 3 illustrates certain alternative embodiments of the vehicle control and communication via a device in proximity of FIG. 1

FIG. 3 illustrates an example wireless device 300 in which embodiments may be implemented. Alternatively, wireless device 300 may be similar to or even the same as wireless device 100 (FIG. 1).

Referring to FIG. 3, wireless device 300 may include a display system 153 for displaying a variety of information, such as a user interface 155, which may include a menu 156. Wireless device 300 may also include a controller 160 for providing overall control of wireless device 300, a communication device 348, which includes a radio frequency identification (RFID) tag 302 with an antenna 340 and/or an RFID reader 304 with an antenna 342, to transmit (send) and receive signals with other devices that communicate via RFID, determination logic 154 for making various determinations, and automatic invocation system 198 for automatically invoking operations with minimal or, in some cases, no user interaction, for example. Input System 159 may include non-default actions 199 which may be, for example, button or key presses, or the like that may be used to indicate that a non-default action should be invoked by the wireless device 300 or by another device.

Wireless device 300 may also include or store proximity information 158 relating to one or more first devices 101.

Proximity information 158 may provide, for example, information relating to a location or closeness or proximity of one or more of the first devices 101 to the wireless device 300.

First devices 101 may include a first device 301 shown in FIG. 3. First device 301 may be associated with a vehicle 330. Vehicle 330 may be any type of vehicle, such as an automobile (e.g., car, truck, bus), locomotive, plane, or other vehicle. First device 301 may include vehicle related systems 120, which may include one or more of an information system 314, an audio and/or video system 316, a heating and/or air conditioning system 318, a lighting control system 322, a navigation system 324, a lock system 326, an ignition system 328, a driver settings system 352, a security system 320, a communication system 349, and a user customization system 350, for performing operations with respect to the vehicle 330. First device 301 may optionally include a display 355 for displaying information and/or an input device 354 for receiving input.

According to an example embodiment, first device 300 may include a controller 312 and a communication device 310. The communication device 310 may include an RFID tag 308 with an antenna 336 and/or an RFID reader 306 with an antenna 338. The RFID tag 308 further includes, a transponder 334 connected to circuitry 344. The RFID reader 306 further includes energizer, demodulator, and decoder circuits 332 and circuits 346. Communication devices 310 and 348 may each also include a wireless transceiver, such as transceiver 157 from FIG. 1. The communication device 310 may be configured to transmit (send) and receive signals with other devices that communicate via RFID, according to an example embodiment.

In operation, communication devices 310 and 348, for example, may be used to establish a proximity related connection. For example, antenna 338 or 342 may be used to transmit radio-frequency (RF) signals in a relatively short range referred to generally as proximity 106. The RF radiation or transmission may provide a medium or technique for communicating with a transponder tag (RFID tag 302 or 308) and (in the case of passive RFID tags) it may provide the RFID tag 302 or 308 with the energy to communicate. This is helpful with respect to passive RFID devices; since passive RFID devices do not necessarily contain batteries, and can therefore remain usable for very long periods of time.

The antennas 336, 338, 340, and 342 may be affixed to a surface or may be handheld or removable, and may be a variety of different antenna types. For example, the antennas 336, 338, 340 and/or 342 may be built into a door or configured inside a dashboard to accept data from persons or objects passing through or otherwise being within the proximity 106.

Then an RFID tag 302 or 308 passes through the proximity 106 of one of the antennas 338 or 342, the RFID tag may detect an activation signal from the antenna 338 or 342. The activation signal may "wake up" the RFID tag 302 or 308, and the RFID tag may then transmit the information on its microchip to be picked up by the antenna 338 or 342. In addition, the REID tag 302 or 308 may, for example, be of one of two types. 1) Active RFID tags, which typically have their own power source. An advantage of active RFID tags is that the reader can be much farther away and still receive the signal, meaning the area referred to as proximity 106 may increase for such devices. However, such active RFID devices may periodically require new batteries and/or have limited life spans. 2) Passive RFID tags, which typically do not require batteries, and can be much smaller and have a very long life span.

RFID tags 302 or 308 may be read in a wide variety of circumstances. The tag need not be on the surface of the object (and is therefore not subject to wear), the read time is typically less than 100 milliseconds, and large numbers of tags can be read at once rather than item by item.

The wireless device 300 may be controlled by a user 104, for instance, to control one or more of the first devices 101, which are in proximity 106 to the wireless device 300 or nearby to the wireless device 300, such as first device 301. In the example of FIG. 3, wireless device 300 may control first device 301, including any vehicle related systems 120 within first device 301. For example, wireless device 300 may control or perform an operation with respect to one or more of an information system 314, an audio and/or video system 316, a heating and/or air conditioning system 318, a lighting control system 322, a navigation system 324, a lock system 326, an ignition system 328, a driver settings system 352, a security system 320, a communication system 349, and a user customization system 350, for performing operations with respect to the vehicle. The above systems may be activated or controlled using controller 312 in response to an explicit action by the user 104, either through the user interface 155 of the wireless device 300, or by the user's motions and/or gestures, or implicitly in response to a default situation where an action should be performed irrespective of the user's explicit actions. For example, a signal may be transmitted, either as a default action or in response to user input, from wireless device 300 to first device 301 to perform an operation with respect to the vehicle or control one of the vehicle related systems 120.

According to an example embodiment, proximity 106 may refer to an area that is near or in proximity to the wireless device 300. Thus, the various first devices 101, such as first device 301, may be in proximity or near the wireless device 300. Proximity 106 may also be defined as a relative location, or distance between two devices (i.e., the wireless device 300 and the first device 301), and includes changes in distance between the devices, such as rate of closure between the two devices. The rate of closure may be affected, for example, by gestures from the user 104, (i.e., tilting a device, moving one device closer to another device, or sequences of changes that occur within proximity 106 over time). Gesture-based actions within proximity 106 may be interpreted by the wireless device 300 or the first device 301. In the example of FIG. 3, the proximity 106 may include for instance, the range of antennas 336, 338, 340, and 342, since an RFID communication device such as communication device 310 or 348 operates in the general range that the antennas 336, 338, 340, and 342 are capable of reliably transmitting and receiving RF signals. Typically, this may be a fairly short range, but the range may be increased if high-frequency devices are used.

According to an example embodiment, the first device 301 and the wireless device 300 may establish a wireless connection or wireless link and may exchange data when the two devices are near each other or within a maximum distance, e.g., when the first device 301 is within proximity 106 or near the wireless device 300. For example, when a user 104 carrying the wireless device 300 (or other device) moves toward the area generally indicated as proximity 106 in FIG. 1, he begins to make closure with (or move nearer to) the proximity 106. At this point the wireless device 300, the first device 301, or a combination of both may make a determination that the wireless device 300 is in proximity to the first device 301.

Once the first device 301 is in the proximity 106 of (e.g., near or touching) the wireless device 300, a wireless connection or link may be established. A variety of information may then be exchanged between the devices, and one or more actions or operations may be performed with respect to one or more of an information system 314, an audio and/or video system 316, a heating and/or air conditioning system 318, a lighting control system 322, a navigation system 324, a lock system 326, an ignition system 328, a driver settings system 352, a security system 320, a communication system 349, and a user customization system 350, e.g., either as default actions (via automatic invocation system 198), or as non-default actions 199 upon a user selection, for instance.

According to an example embodiment, the wireless device 300 may determine a user interface 155, e.g., based on a determination that the first device 301 is in proximity or near wireless device 300 or based on a determination that the first device 301 has operations that are of particular use to the user 104, or both, as examples. In an example embodiment, the user interface 155 may be provided or displayed on display system 153 of wireless device 300, for example.

In addition, first device 301 may also include an image capture device 371 (e.g., a camera or other image capture device) to capture or detect an image. In an example embodiment, image capture device 371 may detect an image, such as an image of a user or wireless device 300 or other object. For example, image capture device 371 may detect a height or other physical characteristics of a user of wireless device 300, or may detect a visual indicia on the wireless device 300 or user, etc. In an example embodiment, controller 312 may determine that the first device 301 is in proximity to wireless device 300 based on a signal from image capture device 371, such as a signal providing a captured image of a detected user or of wireless device 300, or a captured image of a visual indicia related to the user or the wireless device 300, for example.

A number of examples will now be provided, and these are only illustrative and the embodiments are not limited thereto. In one example, the user 104 may carry the wireless device 300 so that a wireless link or a contact is established with the first device 301, which in turn controls vehicle related systems 120. Automatic invocation system 198 may be used to actuate lock system 326 in order to unlock the vehicle by default, e.g., after the wireless device 300 comes into proximity with the first device 301 (e.g., either through contact with the first device 301 or by establishing a wireless link or communication with first device 301). Alternatively, pressing a button, for example, in non-default actions 199 may present a menu 156 with choices (unlock, adjust seats, unlock all, start engine, turn lights on, and open windows, for example) on the wireless device 300. Walking away from the vehicle may cause the wireless device 300 to exit proximity 106, which may similarly invoke an action automatically via automatic invocation system 198, for example locking the vehicle (or otherwise performing a default set of "leaving" operations that user 104 has set on the wireless device 300). This set of leaving actions may occur, e.g., either in response to a user selection on input system 159, or may occur automatically when the wireless device 300 determines that it is no longer in proximity 106 to the first device 301 (or vice-versa) (e.g., wireless device 300 is no longer contacting the first device 301, wireless device 300 is no longer near or in proximity to the first device 301, wireless device 300 disconnects a wireless link to the first device 301, or wireless device 300 is no longer associated with the first device 301).

The above system may operate with banking and financial related systems 130, for example in the case of a vehicle rental activity by the user 104. The wireless device 300 may be set by default to e.g., via communication with first device 301, to not only unlock the vehicle 330 and start the motor, for example, but it might also charge the user's credit card the fee required to rent the vehicle 330 as well. Such user data needed to complete the transaction may be stored in the wireless device 300, or it may be known by the first device 301 or a third-party intermediary device as well.

Figure 4:
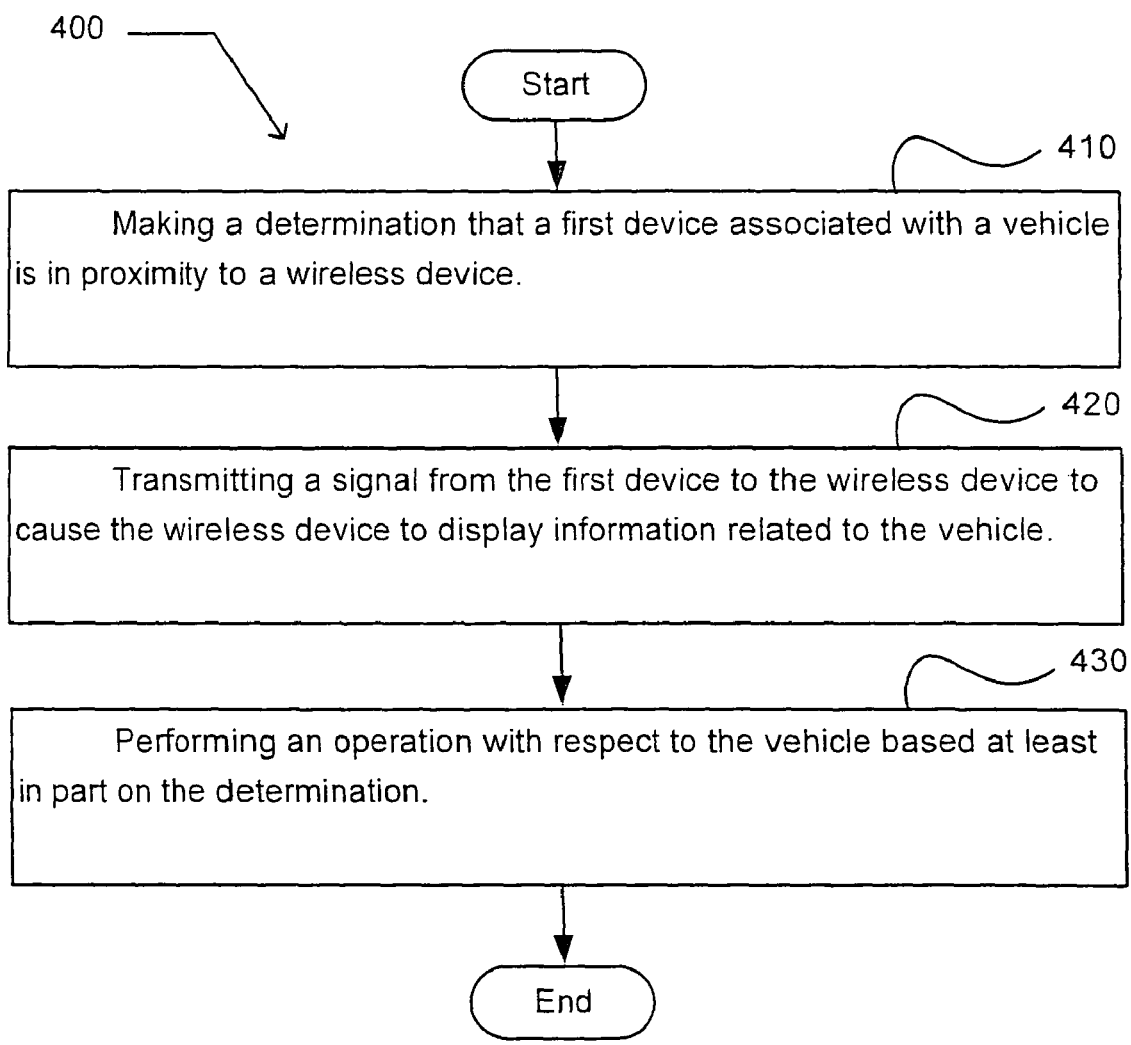
FIG. 4 illustrates an alternative embodiment of the example operational flow of FIG. 3.

FIG. 4 illustrates an operational flow 400 representing example operations related to vehicle control and communication via a device in proximity. In FIG. 4 and in following figures that include various examples of operational flows, discussion and explanation may be provided with respect to the above-described examples of FIGS. 1-3, and/or with respect to other examples and contexts. However, it should be understood that the operational flows may be executed in a number of other environments and contexts, and/or in modified versions of FIGS. 1-3. Also, although the various operational flows are presented in the sequence(s) illustrated, it should be understood that the various operations may be performed in other orders than those which are illustrated, or may be performed concurrently.

After a start operation, the operational flow 400 moves to a making operation 410 where a determination is made that a first device associated with a vehicle is in proximity to a wireless device. For example, as shown in FIG. 3, first device 301 may determine that it is in proximity to wireless device 300, for example, by communication device 310 receiving and/or transmitting RFID signals with communication device 348 of wireless device 300. For example, controller 312 of first device 301 may determine that the first device 301 is in proximity to wireless device 300 based on RFID signals received from wireless device 300. Alternatively, wireless device 300 may determine that it is in proximity to first device 301.

Then, in a transmitting operation 420, a signal is transmitted from the first device to the wireless device to cause the wireless device to display information related to the vehicle. For example, communication device 310 of first device 301 may transmit a signal to wireless device 300 to cause wireless device 300 to display on display system 153 information related to vehicle 330, such as, for example, a menu of vehicle operations that may be performed on vehicle 330, or an operation that has been performed on vehicle 330. For example, a signal may be transmitted from first device 301 to wireless device 300 to cause a user interface 155 to be displayed on display system 153 of wireless device 300. The user interface 155 may be displayed on display system 153, e.g., including a menu of operations that may be performed using the first device 301. In addition, display system 153 may include a user interface 155 that may be performed in a variety of different ways, such as shown and described in the examples of FIG. 1-3, including using a menu 156. Also, in response to the signal transmitted from the first device 301, information may be displayed on display system 153 including a plurality of operations that are available to the first device 301 via vehicle related systems 120. This displayed information may, for example, combine or aggregate one or more operations into a single menu or a plurality of menus as a user interface 155 on display system 153 of the wireless device 300, for example.

Then, in a performing operation 430, an operation is performed with respect to the vehicle based at least in part on the determination. For example, an operation(s) may be performed related either to a local or remote transmission of the digital data, or to another type of transmission. As discussed herein, in addition to accessing, querying, recalling, or otherwise obtaining the digital data for the performing, making, or determining operations, operations may be performed related to storing, sorting, identifying, associating, or otherwise archiving the digital data to a memory, including, for example, sending and/or receiving a transmission of the digital data from a remote memory. Accordingly, any such operation(s) may involve elements including at least an operator (e.g., either human or computer) directing the operation, a transmitting computer, and/or a receiving computer, and should be understood to occur within the United States as long as at least one of these elements resides in the United States.

In an example embodiment, wireless device 300 may perform an operation with respect to the vehicle 330, such as locking a door of the vehicle 330, by transmitting a signal via communication device 348 to cause first device 301 to control one or more of the vehicle related systems 120. This signal or command may be transmitted by wireless device 300 as a default action or in response to a user input. Alternatively, first device 301 may, based at least in part on the determination perform an operation with respect to the vehicle 330, such as locking a door, adjusting the heat via heating A/C system 318, etc.

In an example embodiment, the performing operation 430 may include controller 312 of first device 301 performing a default action based at least in part on the determination, e.g., without direct intervention from the user 104. First device 301 may also perform non-default operations, e.g., in response to a signal received from wireless device 300. For example, the performing operation 430 may include first device 301 automatically billing the user's credit card in the case of a vehicle rental. In the case of audio and/or video system 316, for example, the performing operation 430 may include, first device 301 turning the radio on to a specific, station at a specified volume with specified audio qualities such as tone, balance, treble, bass, and fade. In the case of heating and/or air conditioning system 318, for example, the performing operation 430 may include first device 301 operating the air conditioning and/or heater to achieve a predetermined interior cabin temperature. In the case of lighting control system 22, for example, the performing operation 430 may include first device 301 turning on or off the interior and/or exterior lights, dimming the lights after a certain time period, or otherwise providing an interior and/or exterior lighting scenario that the user 104 desires, e.g., in response to a signal from wireless system 300. In the case of navigation system 324, for example, the performing operation 430 may include first device 301 providing directions from a current location to a default or a list of default or commonly traveled locations. In the case of lock system 326, for example, the performing operation 430 may include, first device 301 actuating the lock system 326 in order to unlock the doors.

The performing operation 430 may include performing a variety of other example operations, e.g., performed by controller 312 of first device 301. For example, in the case of ignition system 328, for example, the performing operation 430 may include, engaging the ignition system. In the case of the driver settings system 352, for example, the performing operation 430 may include automatically moving the seats and/or mirrors to predetermined desired positions. In the case of security system 320, for example, the performing operation 430 may include automatically deactivating the alarm. In the case of communication system 349, for example, the performing operation 430 may include causing one or more communication devices such as cell phones, internet connections, e-mail clients, instant messenger programs, etc., to enter a ready state, to send and/or receive messages, to establish a connection, or to otherwise to be prepared to communicate. In the case of ignition system 328, for example, the performing operation 430 may include activating the motor of the vehicle. In the case of user customization system 350, for example, the performing operation 430 may include invoking the user customizations, which may include changing the interior layout to suit the user's preference, including, for example, the position of the controls, colors, or overall appearance of an LCD, such as display 355, background sounds, and the like.

Figure 5:
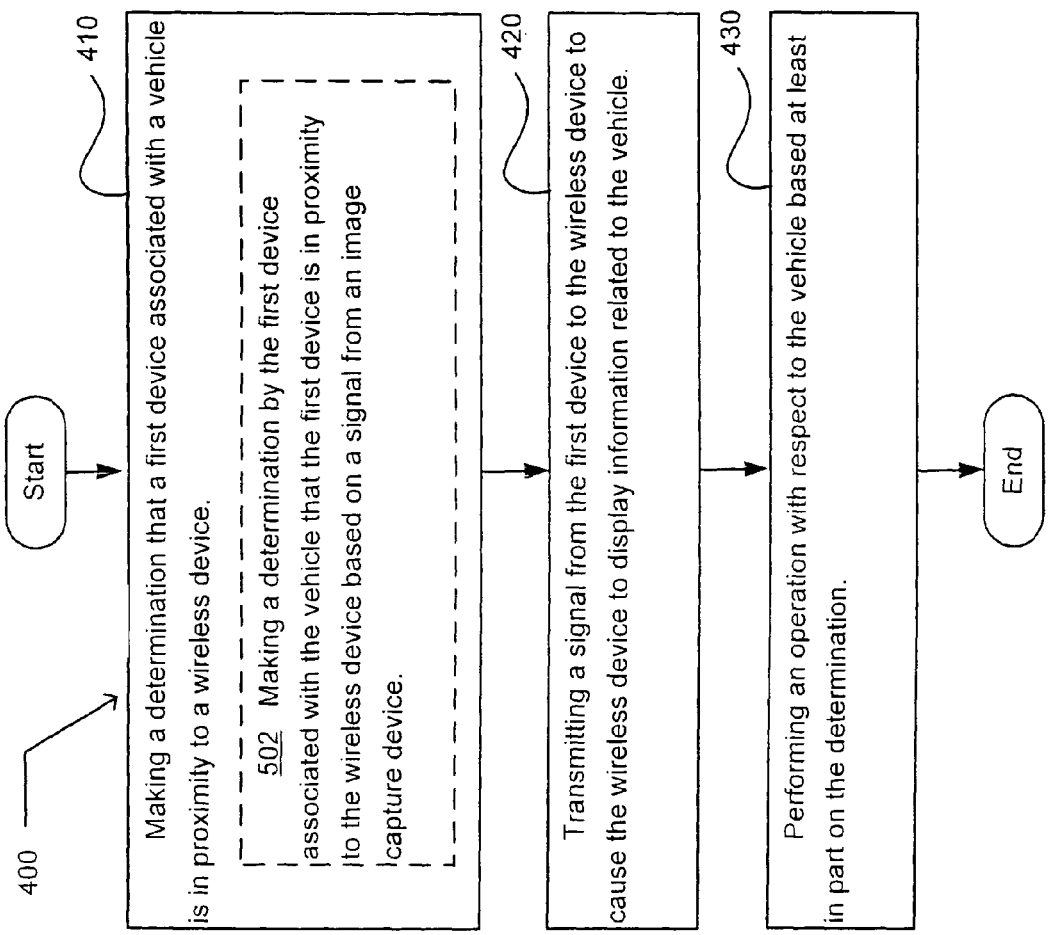
FIG. 5 illustrates an alternative embodiment of the example operational flow of FIG. 3.

FIG. 5 illustrates alternative embodiments of the example operational flow 400 of FIG. 4. FIG. 5 illustrates example embodiments where the making operation 410 may include at least one additional operation. Additional operations may include an operation 502.

At the operation 502 a determination is made by the first device associated with the vehicle that the first device is in proximity to the wireless device based on a signal from an image capture device. For example, as shown in FIG. 3, controller 312 in communication device 310 of the first device 301 may make a determination that the first device 301 is in proximity to the wireless device 300 based on a signal from image capture device 371. For example, the signal from image capture device 371 may provide to controller 312 a captured image of a detected user, of wireless device 300, or other captured image, for example. The image capture device 371 may, for example, provide to controller 312 an image of a visual indicia provided on a user or on wireless device 300, etc. The visual indicia may, for example, identify the wireless device 300 or may identify a user of wireless device 300. A variety of different techniques may be used to determine proximity based on a captured image, such as based on an image of a visual indicia on wireless device 300 or a user, an image of a user of device 300, or an image that may indicate a height or other physical characteristic of a user (e.g., an image providing one or more physical characteristics that may indicate to controller 312 that a user of device 300 is an authorized user).

Figure 6:
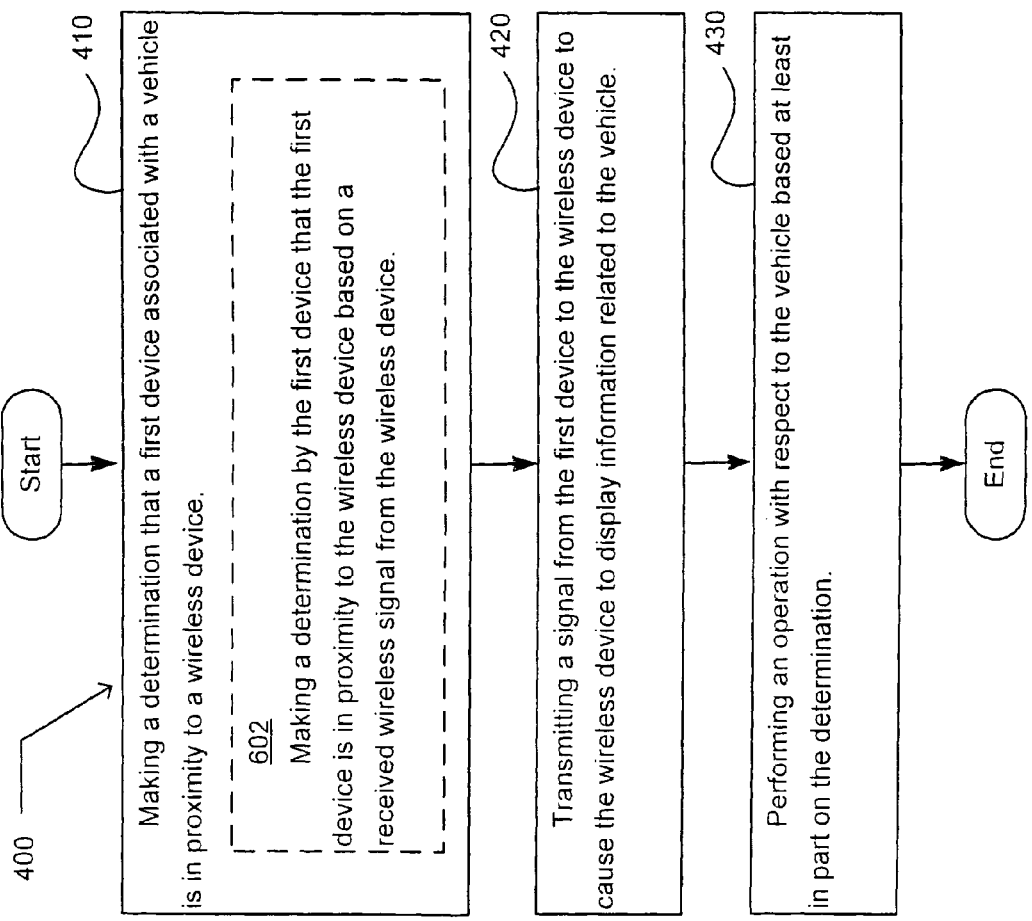
FIG. 6 illustrates an alternative embodiment of the example operational flow of FIG. 3.

FIG. 6 illustrates alternative embodiments of the example operational flow 400 of FIG. 4. FIG. 6 illustrates example embodiments where the making operation 410 may include at least one additional operation. Additional operations may include an operation 602.

At the operation 602 a determination is made by the first device that the first device is in proximity to the wireless device based on a received wireless signal from the wireless device. For example, as shown in FIG. 3, controller 312 in communication device 310 of first device 301 may make a determination that first device 301 is in proximity 106 or near the wireless device 300 by wirelessly detecting the wireless device 300 and/or establishing a wireless link, an RFID link, or other link or connection with the wireless device 300, for example.

Figure 7:
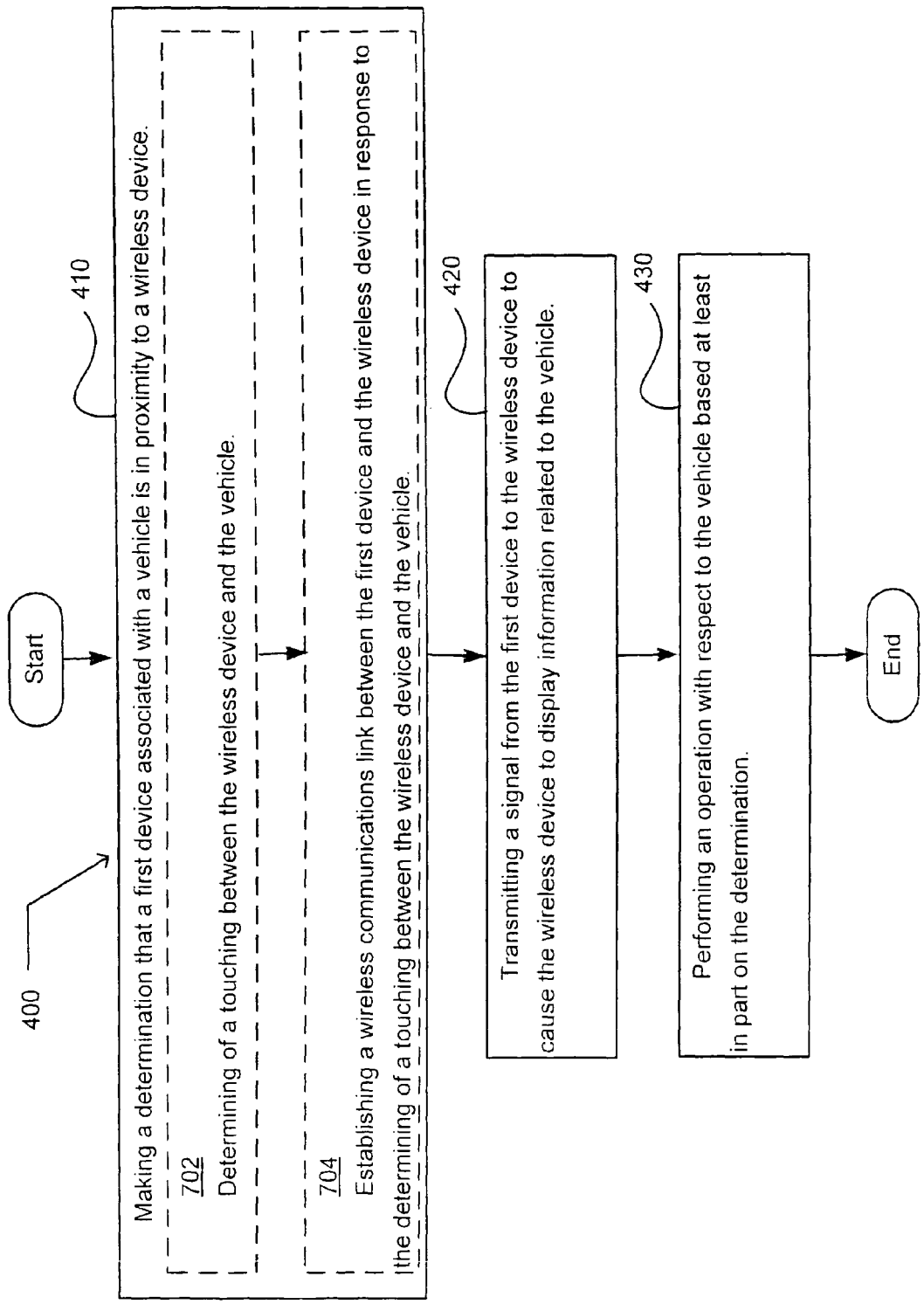
FIG. 7 illustrates an alternative embodiment of the example operational flow of FIG. 3.

FIG. 7 illustrates alternative embodiments of the example operational flow 400 of FIG. 4. FIG. 7 illustrates example embodiments where the making operation 410 may include at least one additional operation. Additional operations may include an operation 702, and/or an operation 704.

At the operation 702 a touching between the wireless device and the vehicle is determined. For example, as shown in FIG. 3, controller 312 in communication device 310 of the first device 301, or controller 160 in wireless device 300, may make a determination that the wireless device 300 is touching the vehicle 330 by detecting a contact between the wireless device 300 and vehicle 330, for example. Alternatively, the first device 301 may make a determination that it (or vehicle 330) is touching or contacting the wireless device 300 by wirelessly detecting the wireless device 300 and/or establishing a wireless link, an RFID link, or other link or connection with the wireless device 300, for example.

At the operation 704 a wireless communications link is established between the first device and the wireless device in response to the determining of a touching between the wireless device and the vehicle. For example, a wireless link may be established between communication devices 30 and 348. In one example, the RFID tag 308 may become in proximity 106 to antenna 342, typically when the user 104 walks toward the first device 301. RFID tag 308 may detect an activation signal from the antenna 342. The activation signal may "wake up" the RFID tag 308 and it transmits the information on its microchip to be received up by the antenna 342.

Figure 8:
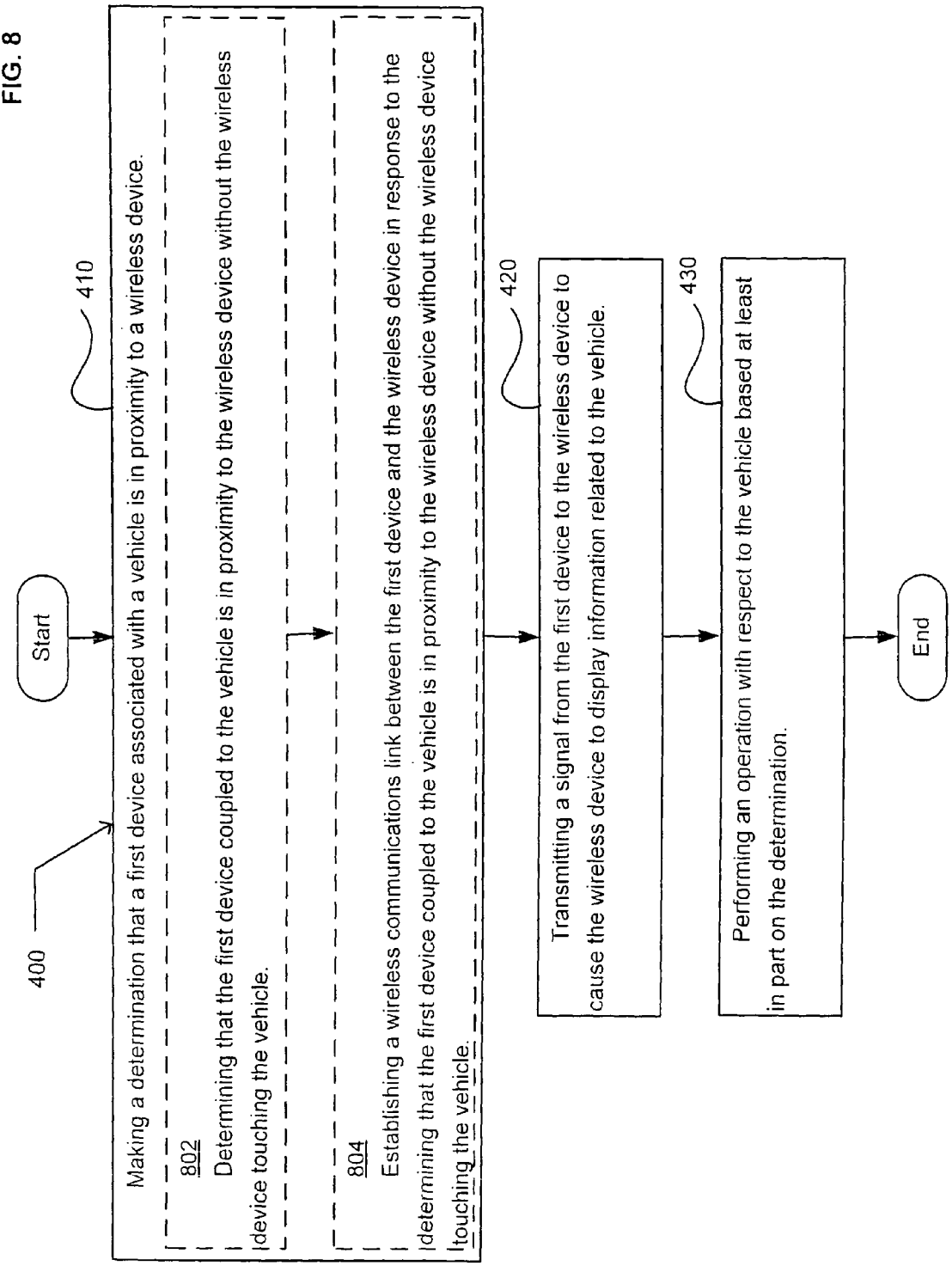
FIG. 8 illustrates an alternative embodiment of the example operational flow of FIG. 3.

FIG. 8 illustrates alternative embodiments of the example operational flow 400 of FIG. 4. FIG. 8 illustrates example embodiments where the making operation 410 may include at least one additional operation. Additional operations may include an operation 802, and/or an operation 804.

At the operation 802 a first device coupled to a vehicle is determined to be in proximity to a wireless device without the wireless device touching the vehicle. For example, as shown in FIG. 3, controller 312 in communication device 310 of the first device 301 may make a determination that the wireless device 300 is in proximity without touching the first device 301 by receiving an RFID signal from wireless device 301.

At the operation 804 a wireless communications link between the first device and the wireless device is established in response to the determining that a first device coupled to a vehicle is in proximity to a wireless device without the wireless device touching the vehicle. For example, communication device 310 of first device 301 may establish a wireless communications link with communication device 348 of wireless device 300. The communications link may operate, for example, as shown in FIG. 3, with respect to the link established between communication devices 310 and 348. In another example, the RFID tag 302 becomes in proximity 106 to antenna 338. RFID tag 302 detects an activation signal from the antenna 338. The activation signal "wakes up" the RFID tag 302 and it transmits the information on its microchip to be picked up by the antenna 338.

Figure 9:
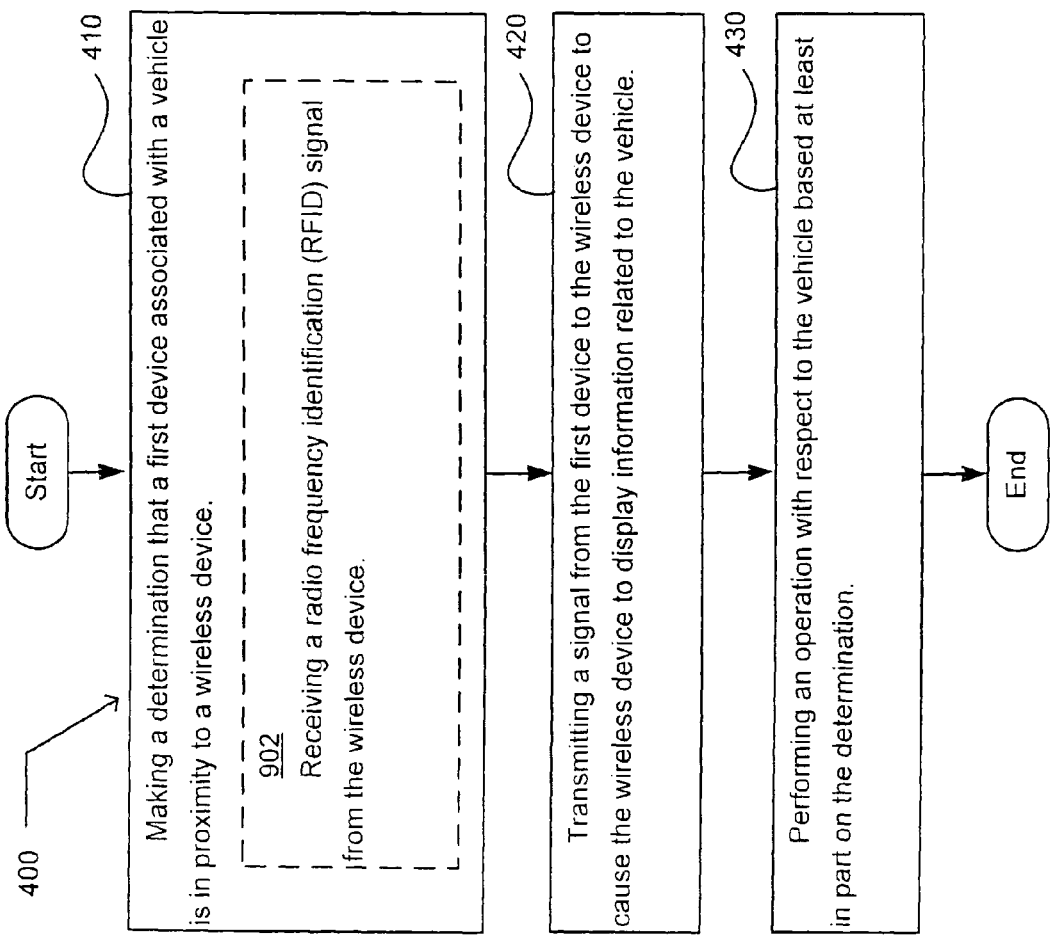
FIG. 9 illustrates an alternative embodiment of the example operational flow of FIG. 3.

FIG. 9 illustrates alternative embodiments of the example operational flow 400 of FIG. 4. FIG. 9 illustrates example embodiments where the making operation 410 may include at least one additional operation. Additional operations may include an operation 902.

At the operation 902 a radio frequency identification (RFID) signal is received from the wireless device. The RFID signal may be received, for example, at first device 301 from communication device 348 of wireless device 300. For example, as shown in FIG. 3, the RFID tag 302 becomes in proximity 106 to antenna 338. RFID tag 302 detects an activation signal from the antenna 338. The activation signal "wakes up" the RFID tag 302, and it transmits the information on its microchip to be picked up by the antenna 338. The same scenario may occur with regard to RFID tag 308 and antenna 342. Also, or in the alternative, both scenarios may occur simultaneously or relatively simultaneously, wherein the wireless device 300 and the first device 301 are each using both an RFID reader and an RFID tag at about the same time.

Figure 10:
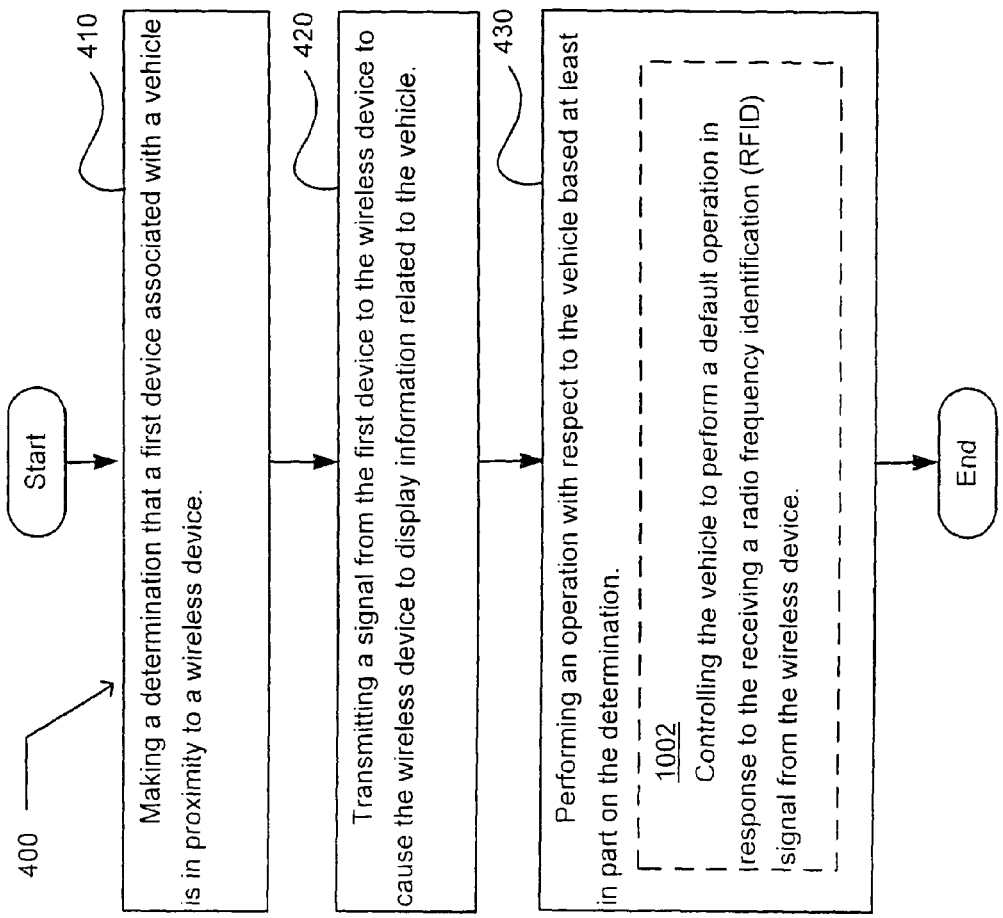
FIG. 10 illustrates an alternative embodiment of the example operational flow of FIG. 3.

FIG. 10 illustrates alternative embodiments of the example operational flow 400 of FIG. 4. FIG. 10 illustrates example embodiments where the performing operation 430 may include at least one additional operation. Additional operations may include an operation 1002.

At the operation 1002 the vehicle is controlled to perform a default operation in response to the receiving a radio frequency identification (RFID) signal from the wireless device. For example, in response to receiving an RFID signal from wireless device 300, controller 312 of first device 301 may perform a number of operations on vehicle 330, such as causing all locks of the vehicle to be unlocked by lock system 326.

Figure 11:
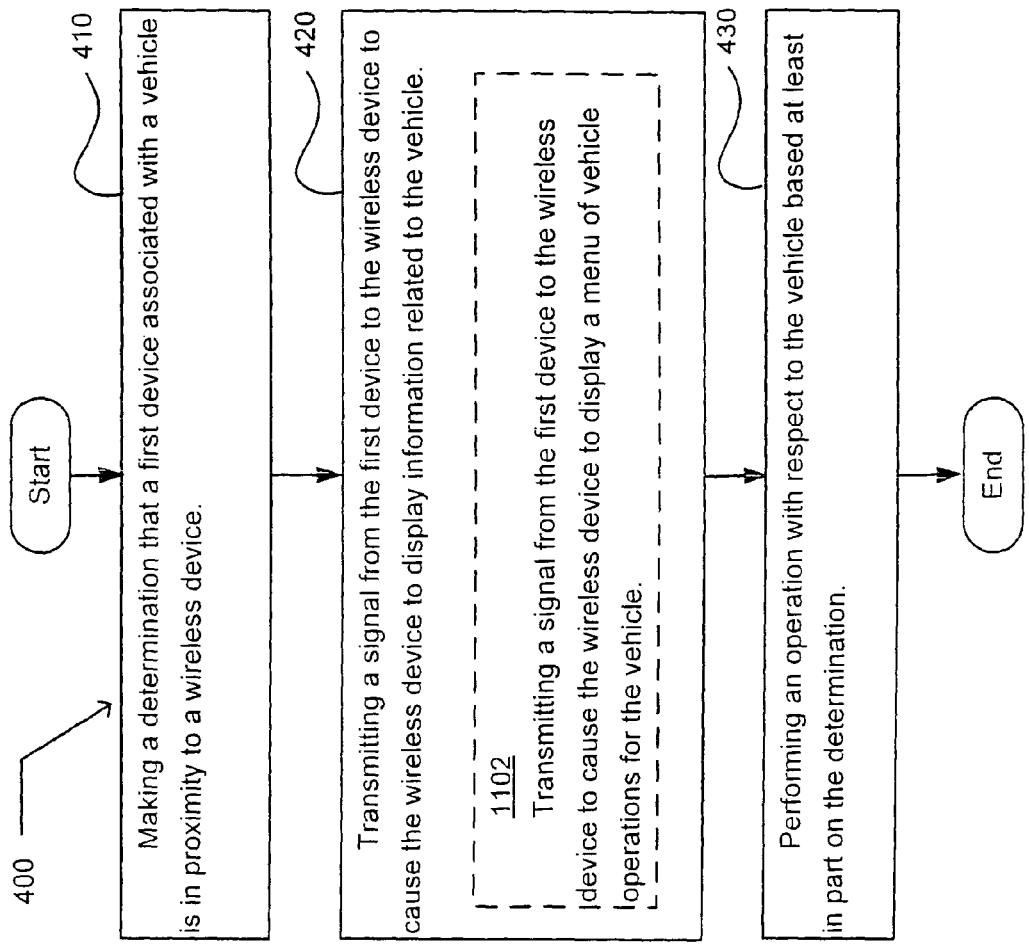
FIG. 11 illustrates an alternative embodiment of the example operational flow of FIG. 3.

FIG. 11 illustrates alternative embodiments of the example operational flow 400 of FIG. 4. FIG. 11 illustrates example embodiments where the determining operation 420 may include at least one additional operation. Additional operations may include an operation 1102.

At the operation 1102 a signal may be transmitted from the first device to the wireless device to cause the wireless device to display a menu of vehicle operations for the vehicle. In an example embodiment, communication device 310 of first device 301 may transmit a signal to wireless device 300 to cause display system 153 of wireless device 300 to display a menu of vehicle operations for vehicle 330. The operations displayed on display system 153 may include, for example, operations that are capable of being performed on one or more of an information system 314, an audio and/or video system 316, a heating and/or air conditioning system 318, a lighting control system 322, a navigation system 324, a lock system 326, an ignition system 328, a driver settings system 352, a security system 320, a communication system 349, and/or a user customization system 350.

Figure 12:
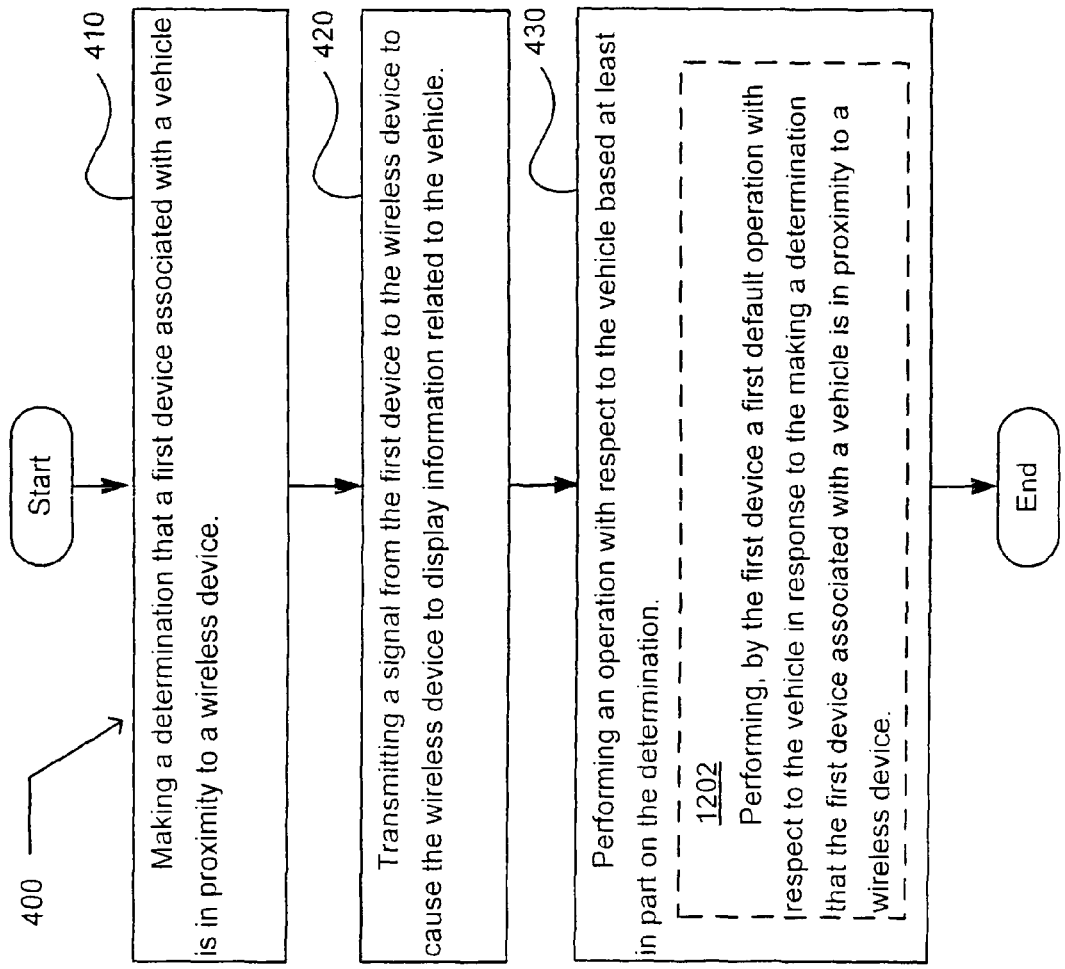
FIG. 12 illustrates an alternative embodiment of the example operational flow of FIG. 3.

FIG. 12 illustrates alternative embodiments of the example operational flow 400 of FIG. 4. FIG. 12 illustrates example embodiments where the performing operation 430 may include at least one additional operation. Additional operations may include an operation 1202.

At the operation 1202 a first default operation is performed by the first device with respect to the vehicle in response to the making a determination that the first device associated with the vehicle is in proximity to the wireless device. For example, if the user 104 approaches the vehicle, the first device 301 may determine that the first device 301 and wireless device 300 are in proximity, and then the user customization system 350 may be controlled by controller 312 to cause the seats of vehicle 330 to move to a pre-determined position associated with the user 104, to cause the mirrors to move to appropriate positions associated with the user 104, and to cause the radio stations associated with the user 104 to be saved as pre-sets in the radio memory, etc.

Figure 13:
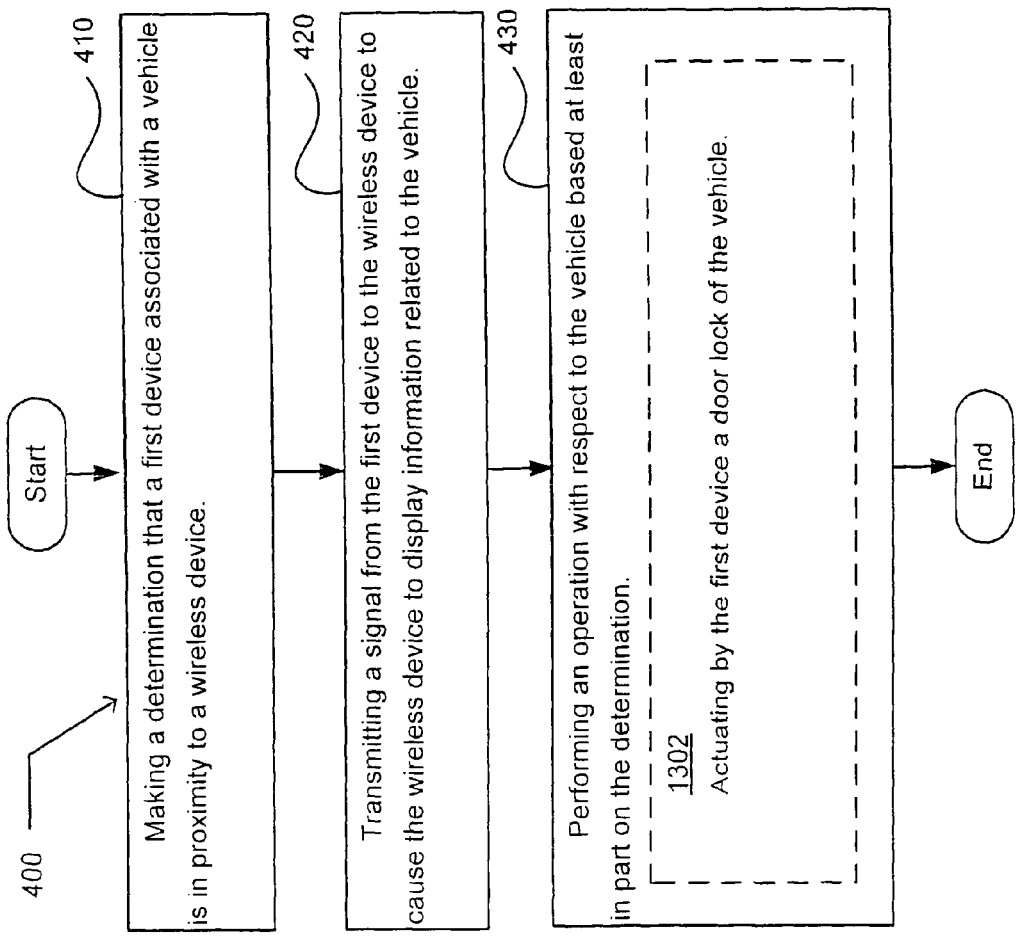
FIG. 13 illustrates an alternative embodiment of the example operational flow of FIG. 3.

FIG. 13 illustrates alternative embodiments of the example operational flow 400 of FIG. 4. FIG. 13 illustrates example embodiments where the performing operation 430 may include at least one additional operation. Additional operations may include an operation 1302.

At the operation 1302 a door lock of the vehicle is actuated by the first device. In an example embodiment, controller 312 of first system 301 may control lock system 326 to actuate a door lock of vehicle 330. For example, as a user 104 with wireless device 300 approaches first device 301 and vehicle 330, the first device 301 may determine that the first device 301 and wireless device 300 are in proximity, and then controller 312 may actuate or unlock a door lock of vehicle 330.

Figure 14:
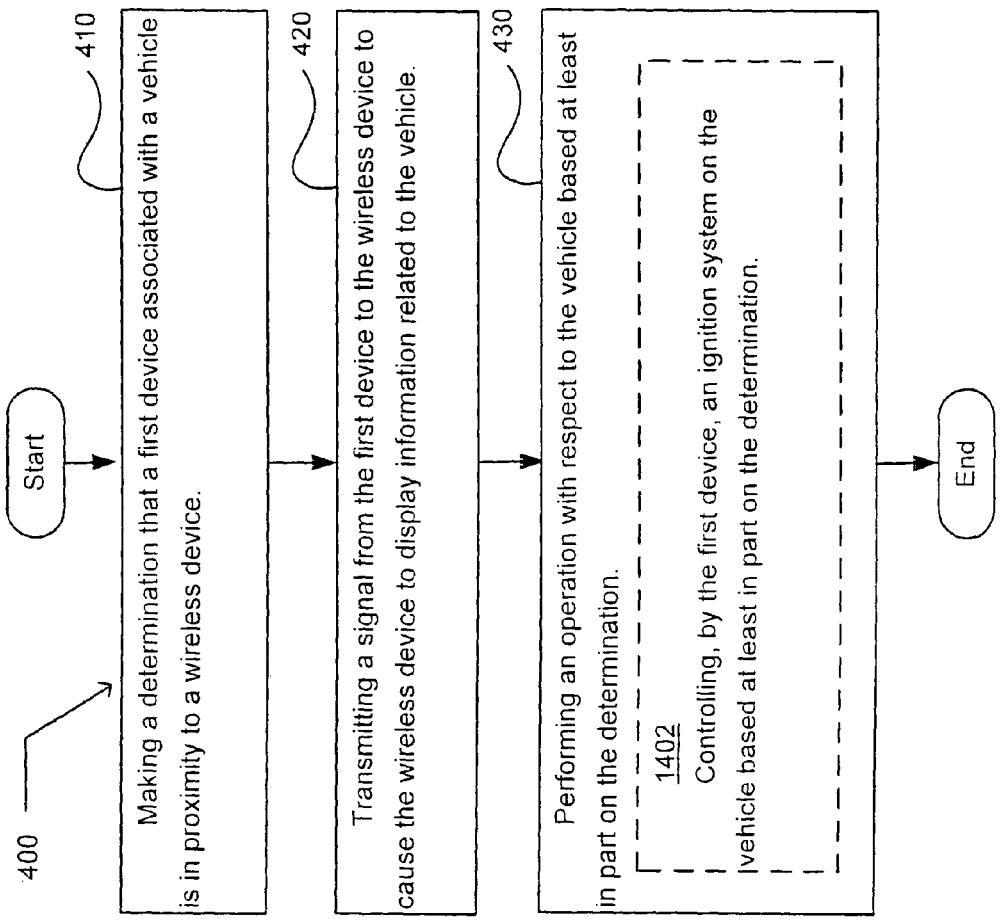
FIG. 14 illustrates an alternative embodiment of the example operational flow of FIG. 3.

FIG. 14 illustrates alternative embodiments of the example operational flow 400 of FIG. 4. FIG. 14 illustrates example embodiments where the performing operation 430 may include at least one additional operation. Additional operations may include an operation 1402.

At the operation 1402 an ignition system is controlled by the first device based at least in part on the determination. For example, based on detection of wireless device 300 and first device 301 being in proximity, controller 312 of first system 301 may actuate ignition system 328 to start vehicle 330.

Figure 15:
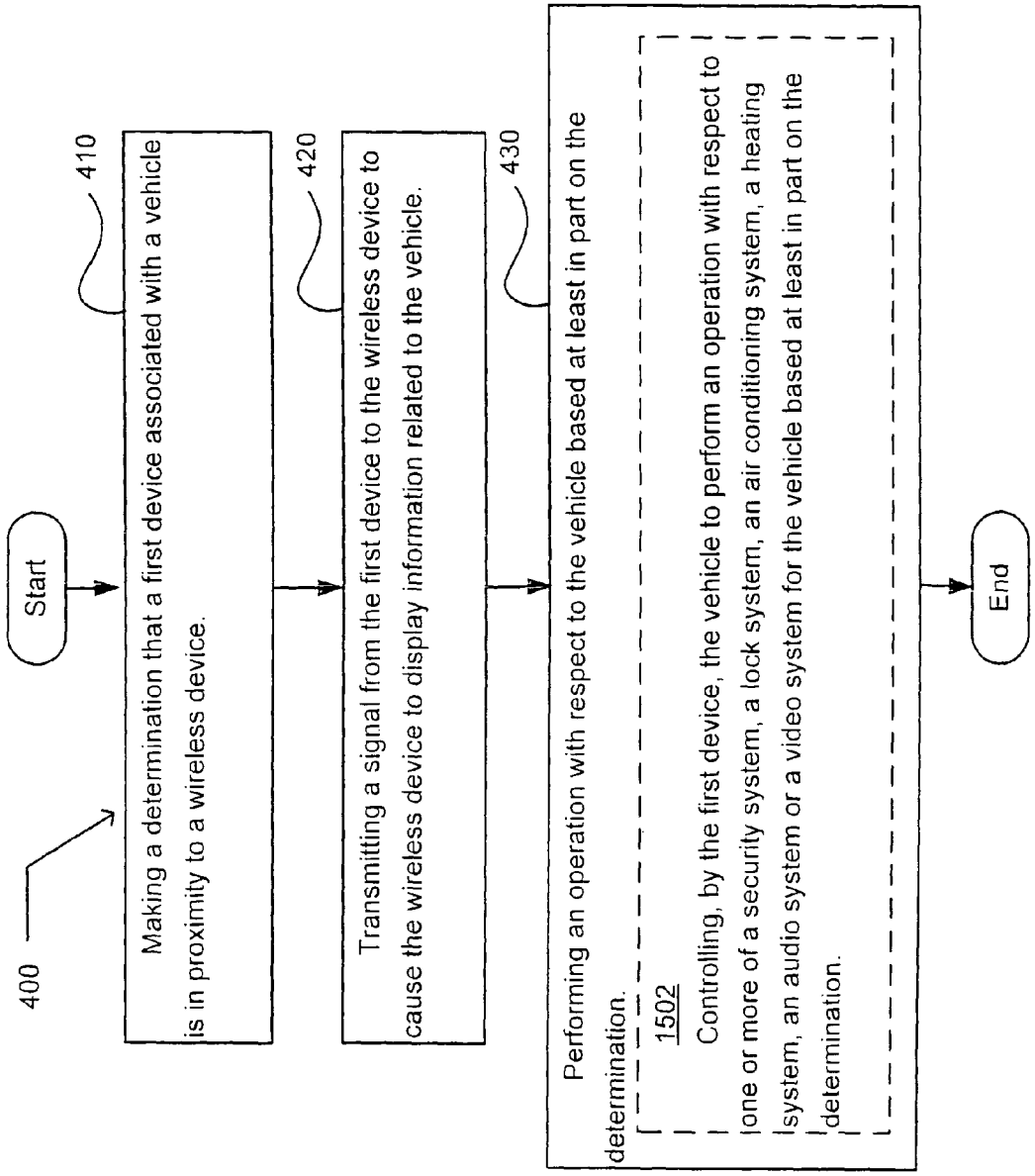
FIG. 15 illustrates an alternative embodiment of the example operational flow of FIG. 3.

FIG. 15 illustrates alternative embodiments of the example operational flow 400 of FIG. 4. FIG. 15 illustrates example embodiments where the performing operation 430 may include at least one additional operation. Additional operations may include an operation 1502.

At the operation 1502 the vehicle is controlled by the first device to perform an operation with respect to one or more of a security system, a lock system, an air conditioning system, a heating system, an audio system or a video system for the vehicle based at least in part on the determination. For example, controller 312 of first device 301 may control the security system 320 and the lock system 326 to deactivate the vehicle security system and unlock the vehicle doors, respectively, e.g., when the user 104 approaches the vehicle.

Figure 16:
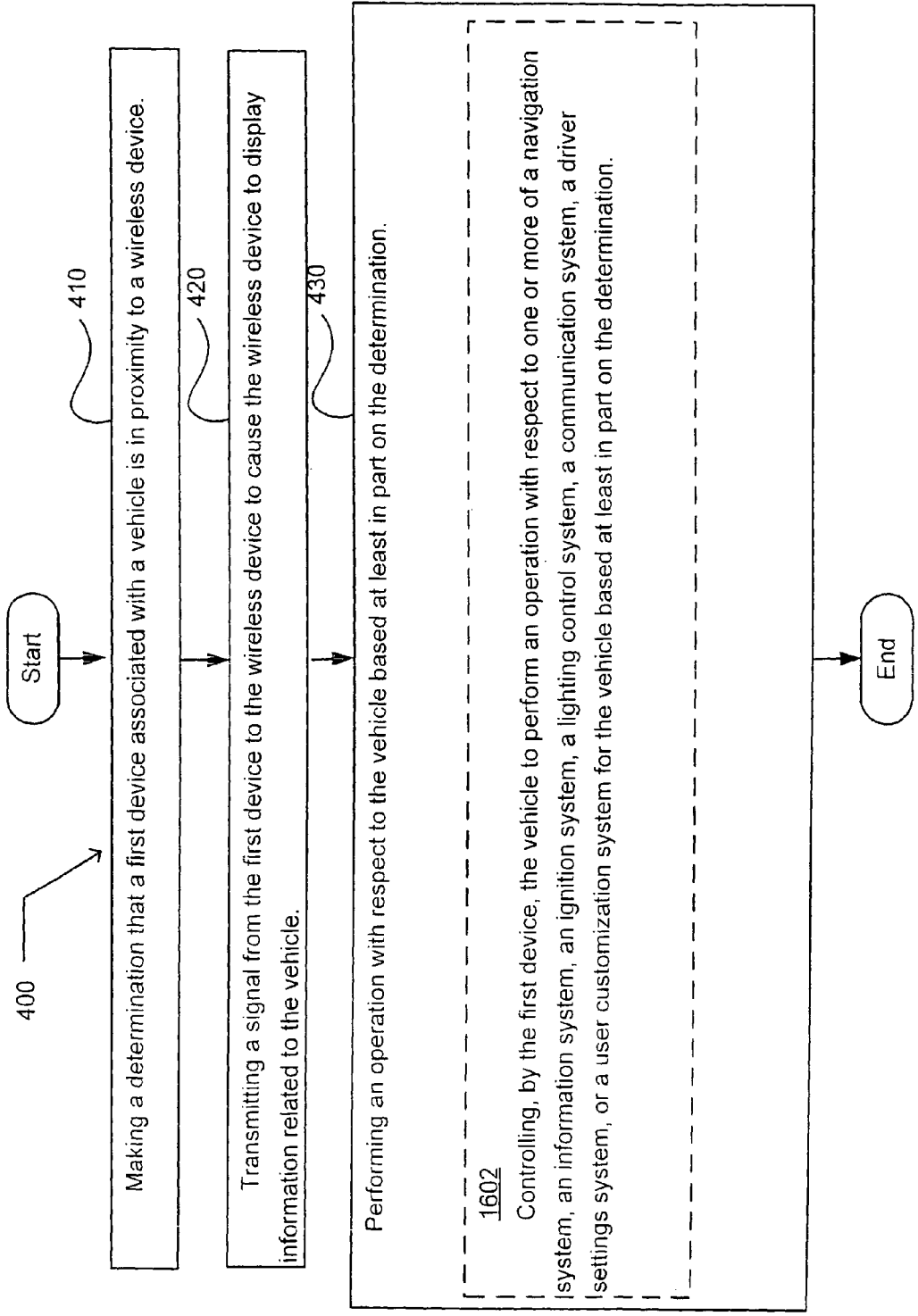
FIG. 16 illustrates an alternative embodiment of the example operational flow of FIG. 3.

FIG. 16 illustrates alternative embodiments of the example operational flow 430 of FIG. 4. FIG. 16 illustrates example embodiments where the performing operation 430 may include at least one additional operation. Additional operations may include an operation 1602.

At the operation 1602 the first device controls the vehicle to perform an operation with respect to one or more of a navigation system, an information system, an ignition system, a lighting control system, a communication system, a driver settings system, or a user customization system for the vehicle based at least in part on the determination. For example, in response to receiving a signal from wireless device 300, first device 301 may control the lighting control system to bring the interior cabin lighting to a pre-determined or default lighting setting, or to a setting that the user 104 has previously programmed in.

Figure 17:
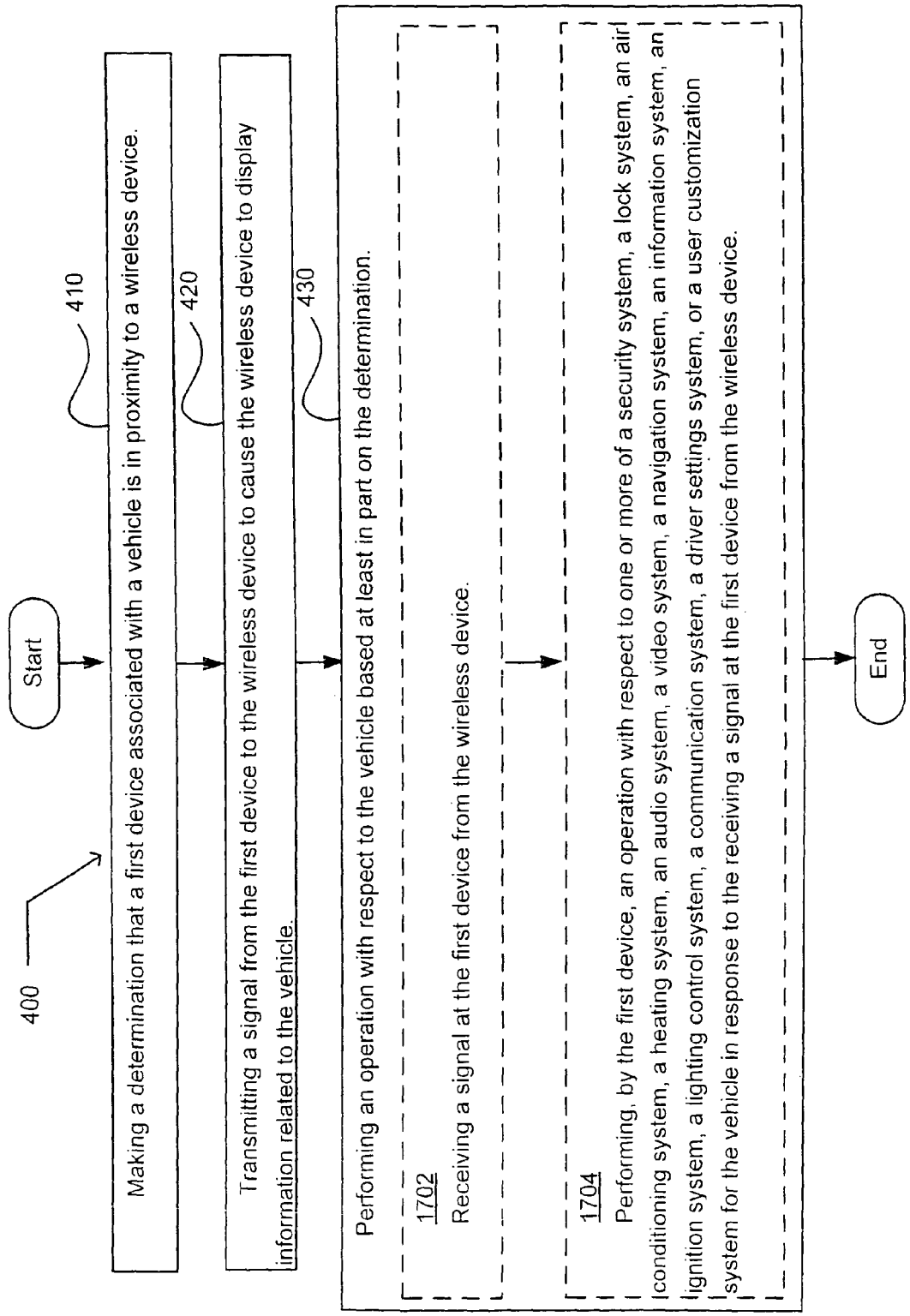
FIG. 17 illustrates an alternative embodiment of the example operational flow of FIG. 3.

FIG. 17 illustrates alternative embodiments of the example operational flow 430 of FIG. 4. FIG. 17 illustrates example embodiments where the performing operation 430 may include at least one additional operation. Additional operations may include an operation 1702 and/or operation 1704.

At the operation 1702 a signal is received at the first device from the wireless device. At operation 1704 the first device performs an operation with respect to one or more of a security system, a lock system, an air conditioning system, a heating system, an audio system, a video system, a navigation system, an information system, an ignition system, a lighting control system, a communication system, a driver settings system, or a user customization system for the vehicle in response to the receiving a signal at the first device from the wireless device. For example, the first device 301 might receive an RFID signal at RFID reader 306 from RFID tag 302 of the wireless device 300, causing the first device to control the communication system 349 to establish an internet connection, send and receive e-mail, or telephone a default number, for example. In another example, in response to receiving a command from wireless device 300, the controller 312 of first device 301 may control user customization system 350 to move the seats and mirrors to predetermined positions, change the interior cabin background sounds, change the LCD or other screen's background and digital control layout, etc.

Figure 18:
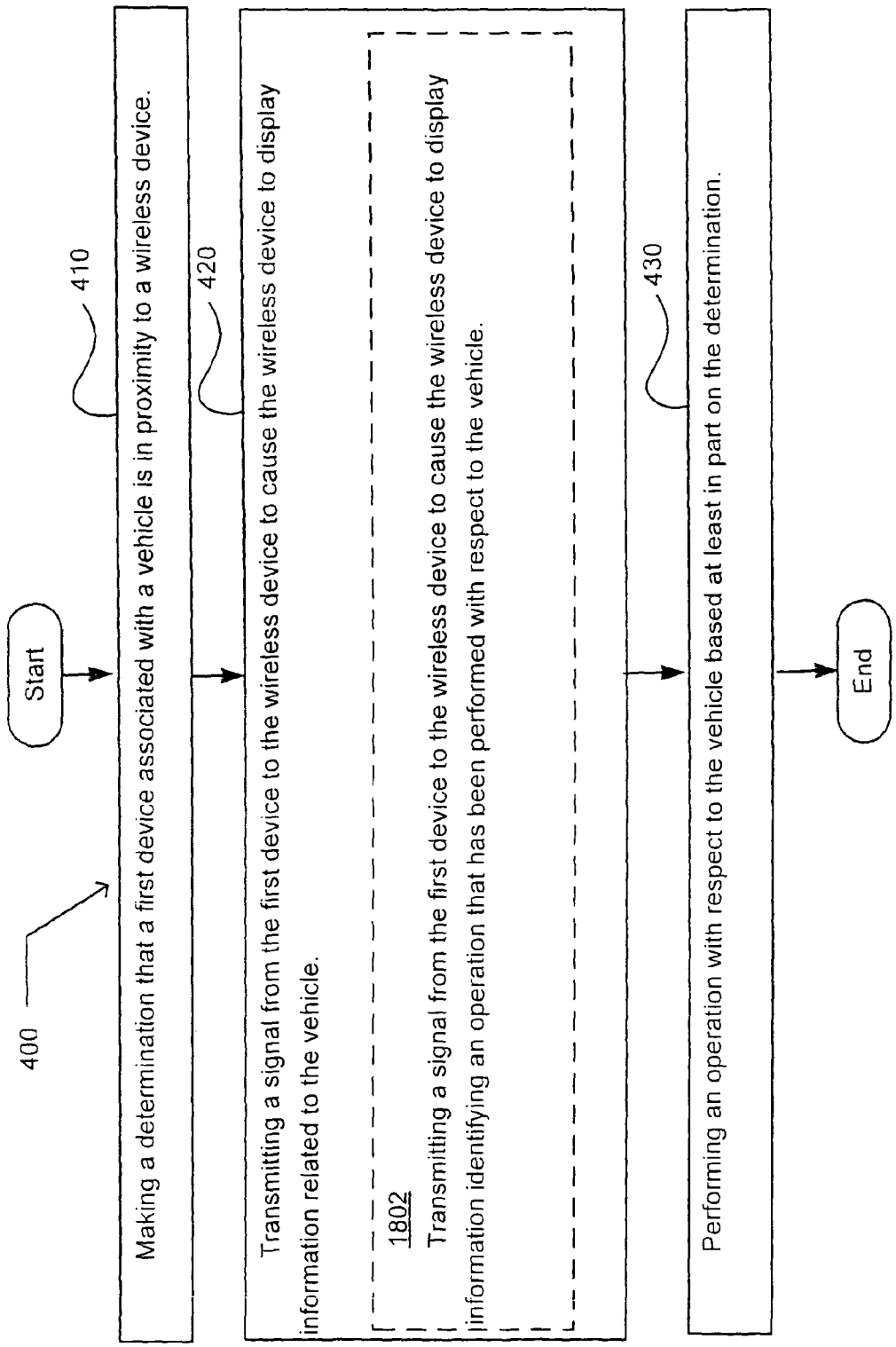
FIG. 18 illustrates an alternative embodiment of the example operational flow of FIG. 3.

FIG. 18 illustrates alternative embodiments of the example operational flow 430 of FIG. 4. FIG. 18 illustrates example embodiments where the performing operation 430 may include at least one additional operation. Additional operations may include an operation 1802.

At the operation 1802 a signal is transmitted from the first device to the wireless device to cause the wireless device to display information identifying an operation that has been performed with respect to the vehicle. For example, after door locks have been locked by lock system 326, communication device 310 of first device 301 may send a signal to wireless device 300 to cause display system 153 on wireless device 300 to display information indicating that door locks on vehicle 330 have been locked.

Figure 19:
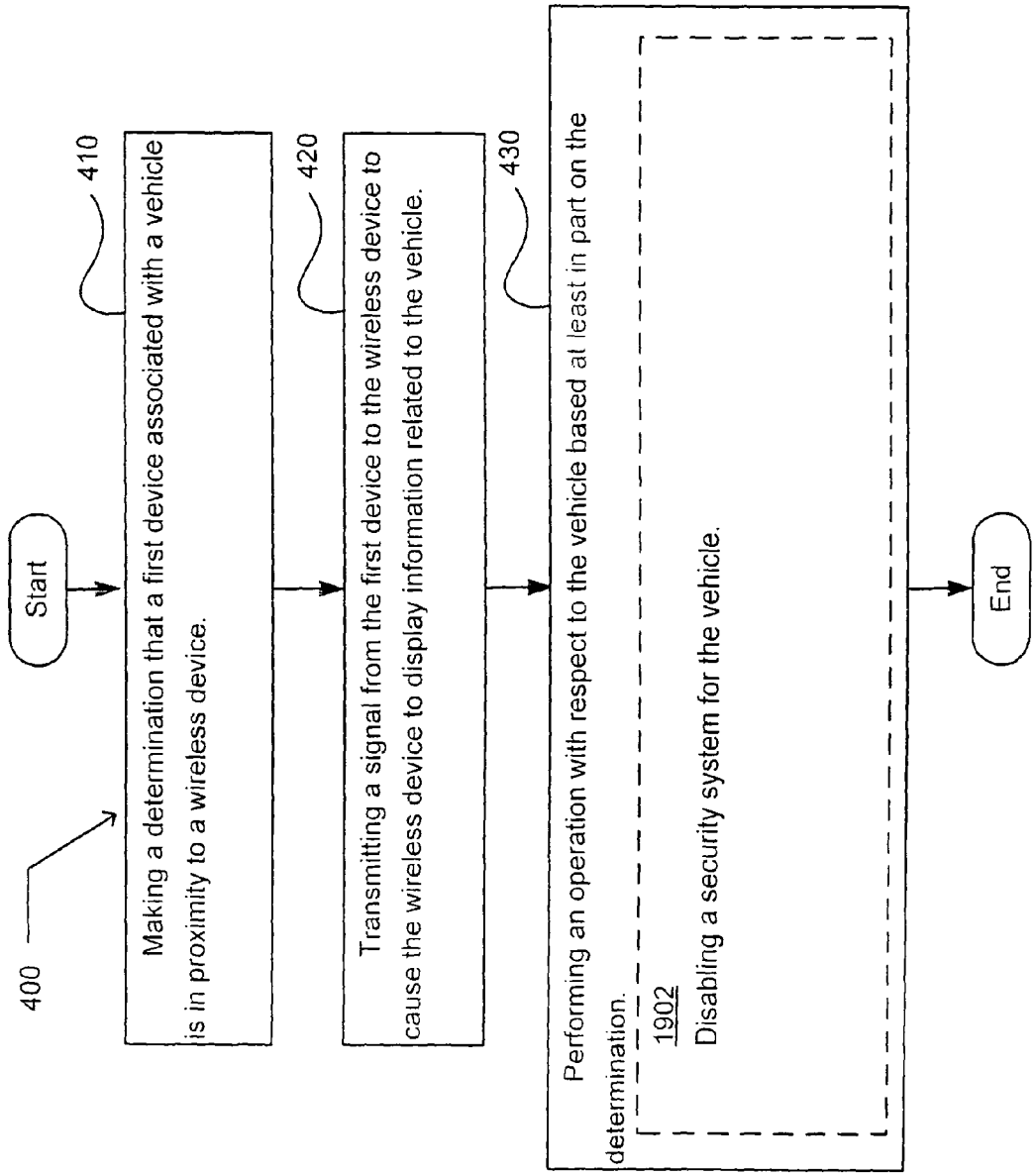
FIG. 19 illustrates an alternative embodiment of the example operational flow of FIG. 3.

FIG. 19 illustrates alternative embodiments of the example operational flow 430 of FIG. 4. FIG. 19 illustrates example embodiments where the performing operation 430 may include at least one additional operation. Additional operations may include an operation 1902.

At the operation 1902 a security system for the vehicle is disabled. For example, a determination may be made that the wireless device 300 is in proximity to first device 301 and coming closer to the driver's door of the vehicle. In such a case, the controller 312 may control security system 320 to turn off or disable the vehicle alarm, if applicable, and open the driver's door lock only, although other settings are possible.

Figure 20:
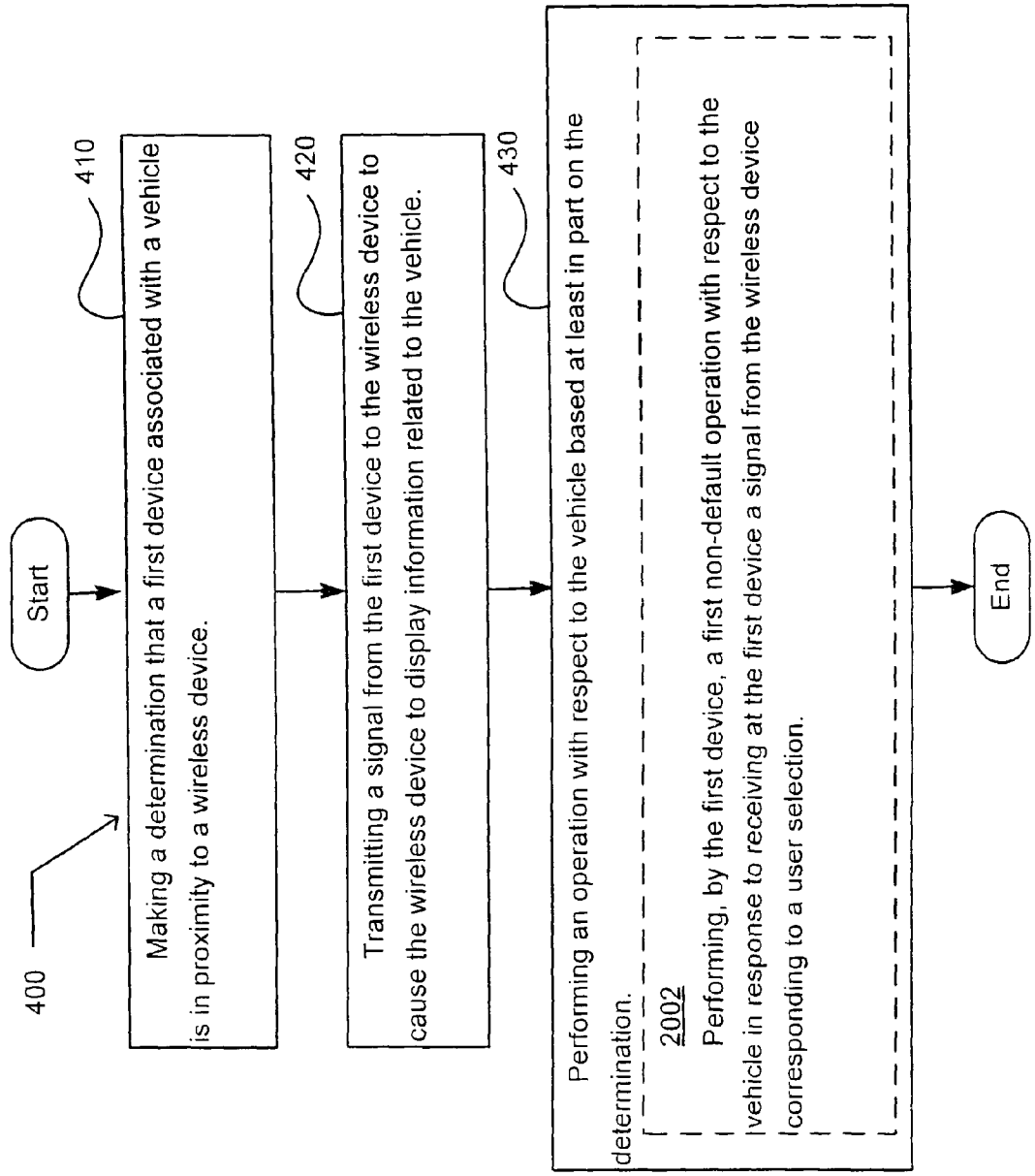
FIG. 20 illustrates an alternative embodiment of the example operational flow of FIG. 3.

FIG. 20 illustrates alternative embodiments of the example operational flow 430 of FIG. 4. FIG. 20 illustrates example embodiments where the performing operation 430 may include at least one additional operation. Additional operations may include an operation 2002.

At the operation 2002 a first non-default operation with respect to the vehicle is performed by the first device in response to receiving at the first device a signal from the wireless device corresponding to a user selection. For example, the user 104 may select an operation on wireless device 300 to "unlock passenger door." Controller 312 of first device 301 may then control lock system 326 to unlock the passenger door lock of vehicle 330 in response to receiving a signal from wireless device 300 corresponding to the user selection.

Figure 21:
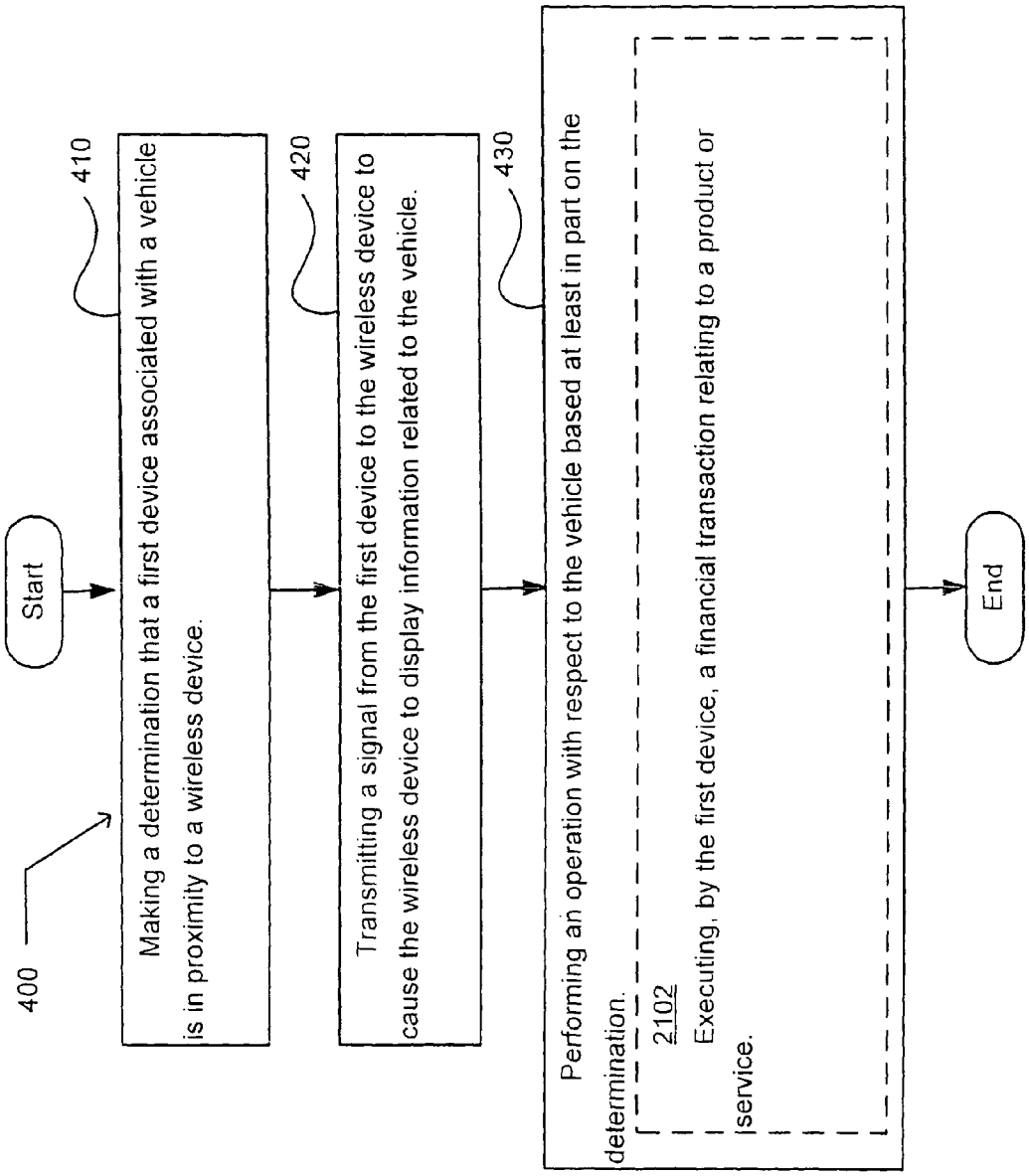
FIG. 21 illustrates an alternative embodiment of the example operational flow of FIG. 3.

FIG. 21 illustrates alternative embodiments of the example operational flow 430 of FIG. 4. FIG. 21 illustrates example embodiments where the performing operation 430 may include at least one additional operation. Additional operations may include an operation 2102.

At the operation 2102 a financial transaction relating to a product or service is executed by the first device. For example, the first device 301 might be configured to operate with one or more service providers, like vehicle rental services, hotels, restaurants, etc. In such a case, the first device 301 may connect to an external source, for example using information system 314 and/or communication system 349 to charge the user's credit card, bank account, or the like. For example, controller 312 of first device 301 may establish a communications link to a computer at a gas station and execute the purchase of gasoline for vehicle 330.

Figure 22:
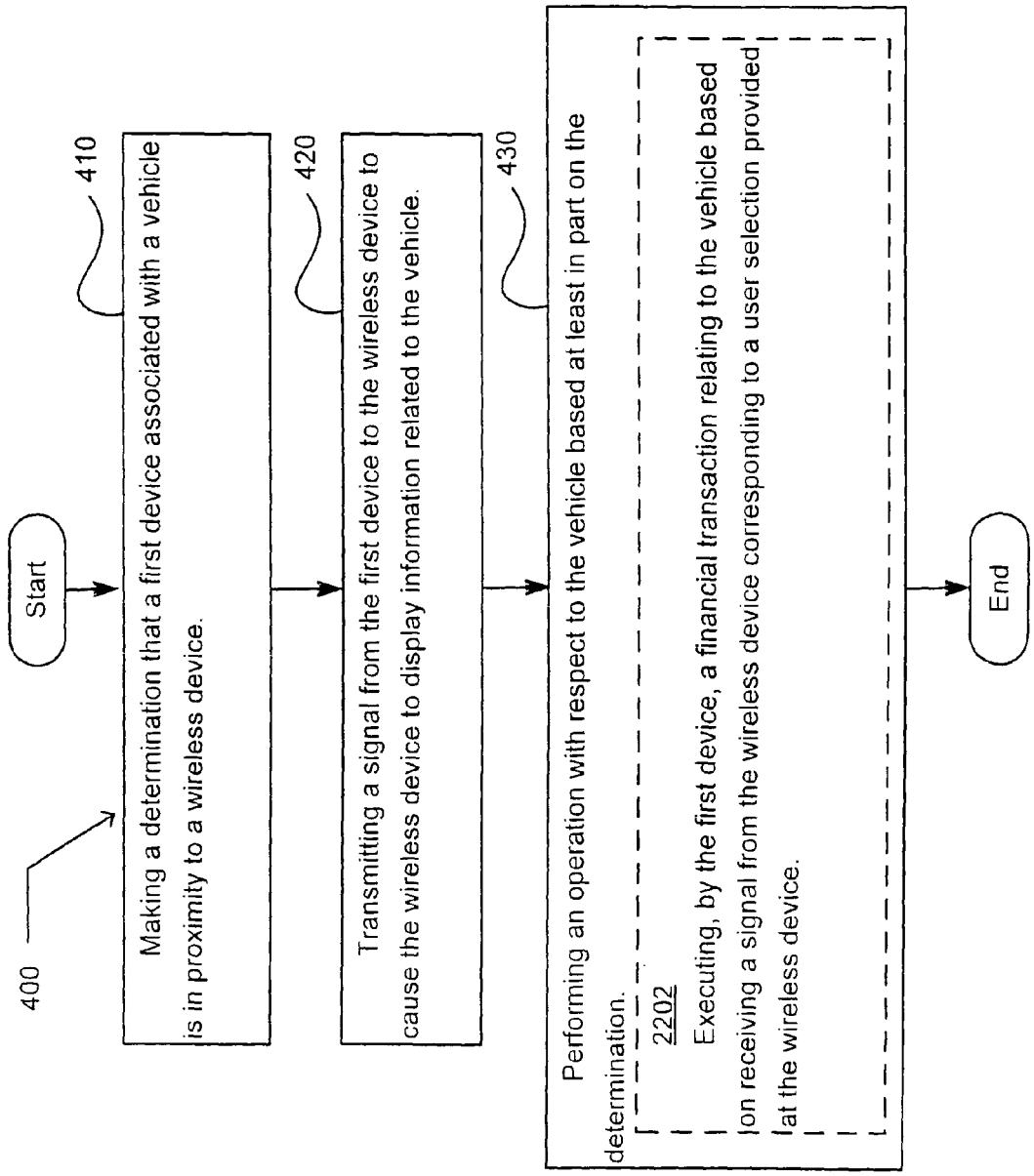
FIG. 22 illustrates an alternative embodiment of the example operational flow of FIG. 3.

FIG. 22 illustrates alternative embodiments of the example operational flow 430 of FIG. 4. FIG. 22 illustrates example embodiments where the performing operation 430 may include at least one additional operation. Additional operations may include an operation 2202.

At the operation 2202 a financial transaction relating to the vehicle is executed by the first device based on receiving a signal from the wireless device corresponding to a user selection provided at the wireless device. For example, the wireless device 300 might be configured to operate with a vehicle rental service and a menu of several potential rental vehicles might be presented to the user on the display system 153. The user 104 may select one of the vehicles from a menu 156 of available vehicles on display system 153, and depending on the selection, a signal is transmitted from wireless device 300 to first device 301 of the selected vehicle 330 to cause first device 301 to execute a financial transaction (e.g., the user's credit card is charged or the user's bank account is debited) in an amount, which represents the cost of the vehicle selected. In another example, first device 301 may execute a financial transaction in response to a user selection input to wireless device 300 to purchase gasoline for vehicle 330. First device 301 may then charge the user's credit card for the purchase amount in response to a received signal corresponding to the user selection to purchase gasoline.

Figure 23:
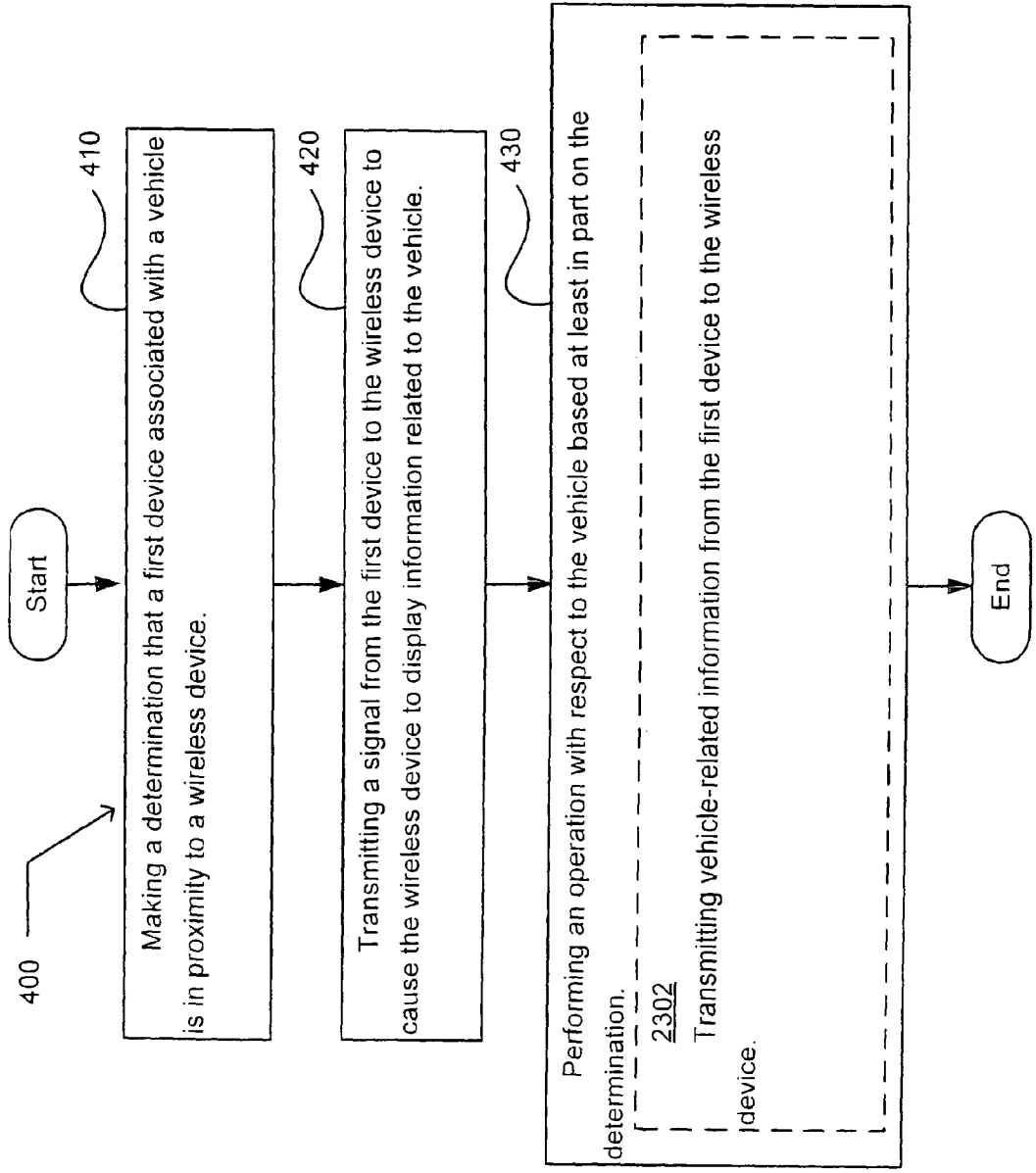
FIG. 23 illustrates an alternative embodiment of the example operational flow of FIG. 3.

FIG. 23 illustrates alternative embodiments of the example operational flow 430 of FIG. 4. FIG. 23 illustrates example embodiments where the performing operation 430 may include at least one additional operation. Additional operations may include an operation 2302.

At the operation 2302 vehicle-related information is transmitted from the first device to the wireless device. For example, vehicle diagnostics, mileage, or other vehicle related information may be transmitted via communication device 310 to wireless device 300.

Figure 24:
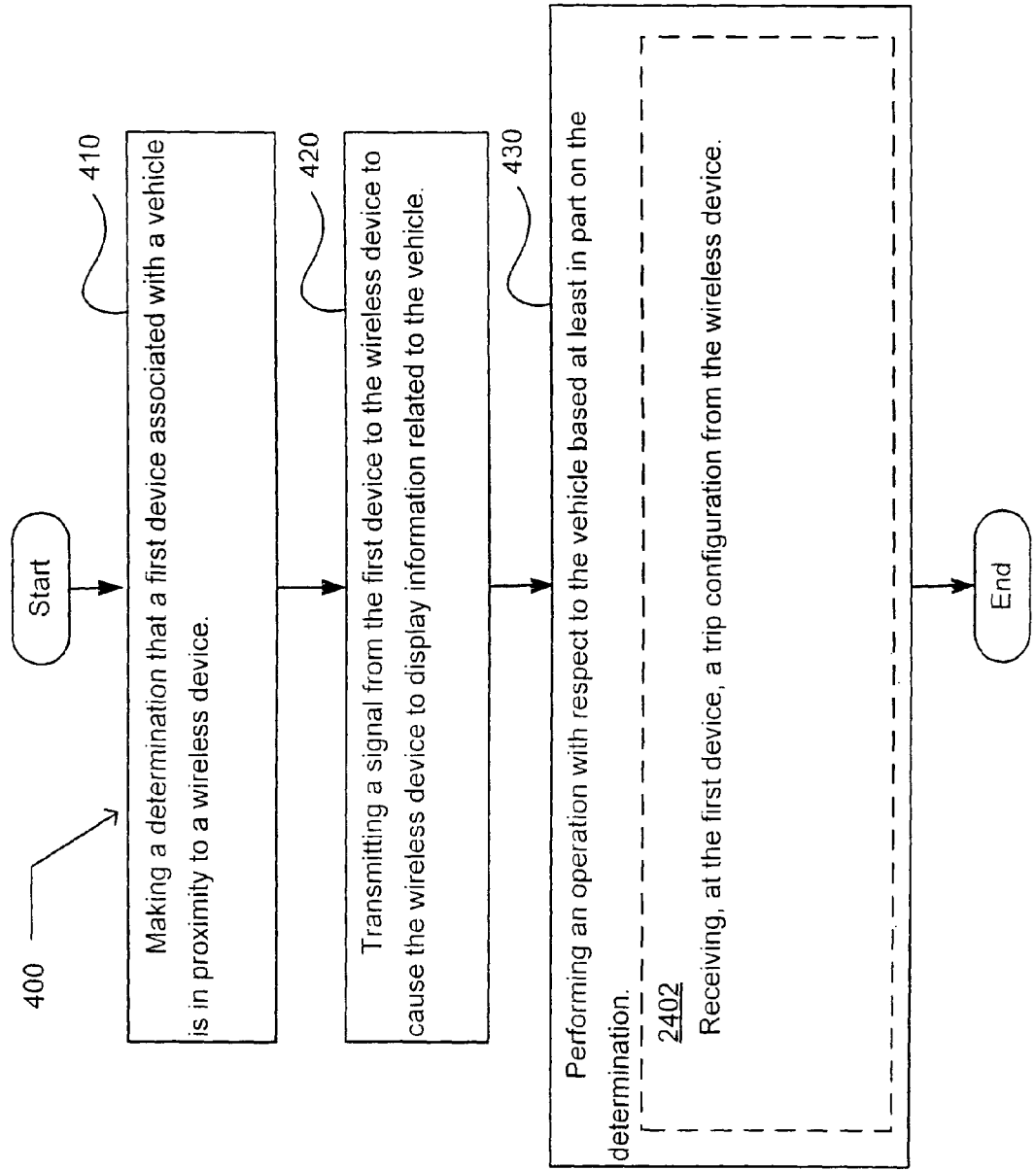
FIG. 24 illustrates an alternative embodiment of the example operational flow of FIG. 3.

FIG. 24 illustrates alternative embodiments of the example operational flow 430 of FIG. 4. FIG. 24 illustrates example embodiments where the performing operation 430 may include at least one additional operation. Additional operations may include an operation 2402.

At the operation 2402 a trip configuration is received at the first device from the wireless device. For example, the wireless device 300 might have a specific trip configuration that the user 104 desires at that time, including a destination address, preferred stops along the way, estimated time of departure, and various other trip related information, such as requested audio or video programming for the trip, etc. The trip configuration may be transmitted by wireless device 300 and received at first device 301 via communication device 310.

Figure 25:
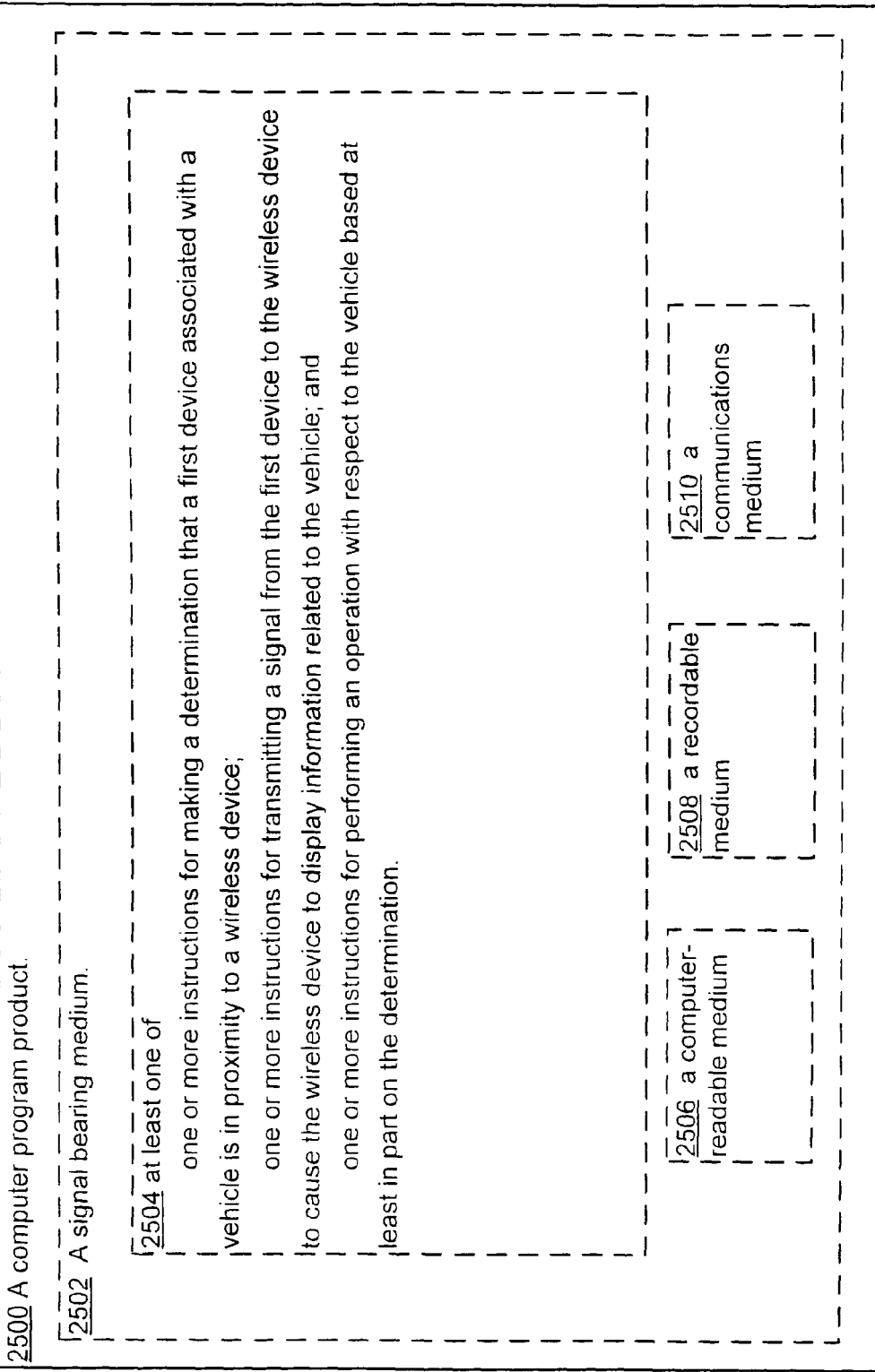
FIG. 25 illustrates a partial view of an example computer program product that includes a computer program for executing a computer process on a computing device.

FIG. 25 illustrates a partial view of an example computer program product 2500 that includes a computer program 2504 for executing a computer process on a computing device. An embodiment of the example computer program product 2500 is provided using a signal bearing medium 2502, and may include at least one of one or more instructions for making a determination that a first device associated with a vehicle is in proximity to a wireless device, the signal bearing medium also bearing one or more instructions for transmitting a signal from the first device to the wireless device to cause the wireless device to display information related to the vehicle, and the signal bearing medium also bearing one or more instructions for performing an operation with respect to the vehicle based at least in part on the determination. The one or more instructions may be, for example, computer executable and/or logic-implemented instructions. In one implementation, the signal-bearing medium 2502 may include a computer-readable medium 2506. In one implementation, the signal bearing medium 2502 may include a recordable medium 2508. In one implementation, the signal bearing medium 2502 may include a communications medium 2510.

Figure 26:
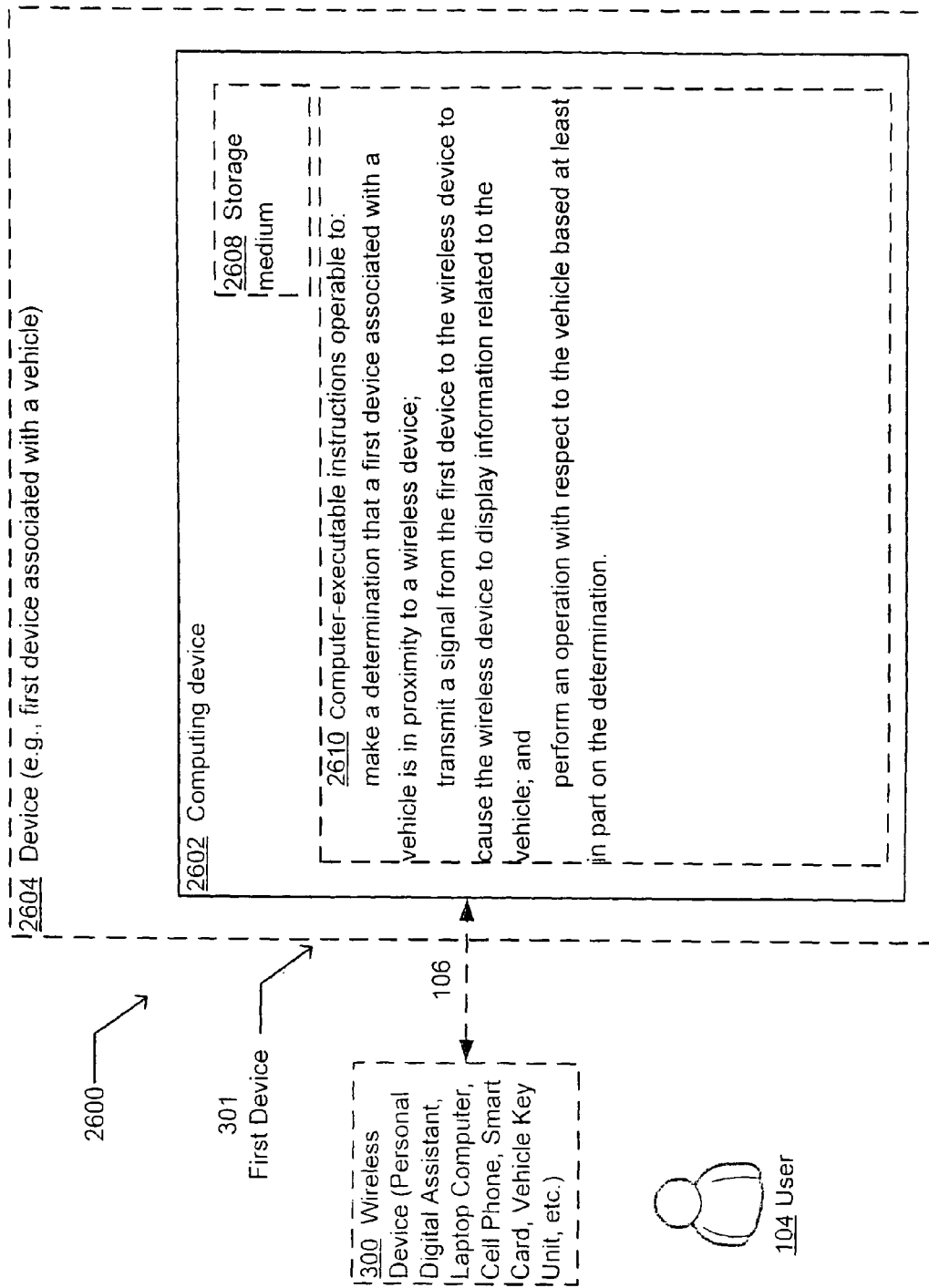
FIG. 26 illustrates an example system in which embodiments may be implemented.

FIG. 26 illustrates an example system 2600 in which embodiments may be implemented. The system 2600 includes a computing system environment that may include wireless device 300 and first device 301. The system 2600 also illustrates the user 104 using the wireless device 300, which is optionally shown as being in communication with the first device 301 by way of a proximity based connection 106. The proximity based connection 106 may represent a local, wide-area, or peer-to-peer network or other wireless link, or may represent a bus that is internal to a computing device (e.g., in example embodiments in which the computing device 2602 is contained in whole or in part within the device 2604). A storage medium 2608 may be any computer storage media.

The first device 301 may use computer-executable instructions 2610 that when executed on the first device 301 may cause the computing devices to make a determination that a first device associated with a vehicle is in proximity to a wireless device, transmit a signal from the first device to the wireless device to cause the wireless device to display information related to the vehicle, and perform an operation with respect to the vehicle based at least in part on the determination.

In FIG. 26, then, the system 2600 includes at least one computing device (e.g., 2602 and/or 2604). The computer-executable instructions 2610 may be executed on one or more of the at least one computing device. For example, the computing device 2602 may implement the computer-executable instructions 2610 and output a result to (and/or receive data from) the computing device 2604. Since the computing device 2602 may be wholly or partially contained within the computing device 2604, the computing device 2604 also may be said to execute some or all of the computer-executable instructions 2610, in order to be caused to perform or implement, for example, various ones of the techniques described herein, or other techniques.

The wireless device 300 may include, for example, one or more of a personal digital assistant (PDA), a laptop computer, a tablet personal computer, a networked computer, a computing system comprised of a cluster of processors, a workstation computer, a cellular phone, a smartcard, a remote control, a vehicle key unit, and/or a desktop computer. In another example embodiment, the wireless device 300 may be operable to communicate with the first device 301 to communicate with a database (e.g., implemented using the storage medium 2608) to access the at least one dataset and/or to access the second dataset.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, a RAM, a flash memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

While certain features of the described implementations have been illustrated as disclosed herein, many modifications, substitutions, changes and equivalents will now occur to those skilled in the art. It is, therefore, to be understood that the appended claims are intended to cover all such modifications and changes as fall within the true spirit of the embodiments of the invention.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A computer program product comprising:
    a non-transitory computer-readable storage medium bearing one or more instructions for performing program instructions operable to perform a process in a computing device, the process comprising:
    (a) one or more instructions for making a determination that a first device associated with a vehicle is in proximity to a wireless device based at least partially on a signal from an image capture device;
    (b) one or more instructions for transmitting a signal from the first device to the wireless device to cause the wireless device to display information related to the vehicle; and
    (c) one or more instructions for performing an operation with respect to the vehicle based at least in part on the determination.

2. A device comprising:
    (a) a determination component configured to make a determination that a first device associated with a vehicle is in proximity to a wireless device based at least partially on a signal from an image capture device;
    (b) a communication component configured to transmit a signal from the first device to the wireless device to cause the wireless device to display information related to the vehicle; and
    (c) a processor configured to control performance of an operation with respect to the vehicle based at least in part on the determination, wherein at least one of the determination component, the communication component, and the processor are at least partially implemented using hardware.

3. The device of claim 2 wherein the communication component configured to transmit a signal from the first device to the wireless device to cause the wireless device to display information related to the vehicle comprises:
    a communication component configured to transmit a signal from the first device to the wireless device to cause the wireless device to display a menu of vehicle operations for the vehicle.

4. A system comprising:
    determination means for making a determination that a first device associated with a vehicle is in proximity to a wireless device based at least partially on a signal from an image capture device;
    communication means for transmitting a signal from the first device to the wireless device to cause the wireless device to display information related to the vehicle; and
    processing means for performing an operation with respect to the vehicle based at least in part on the determination, wherein at least one of the determination means, the communication means, and the processing means are at least partially implemented using hardware.

5. The system of claim 4 wherein the determination means for making a determination that a first device associated with a vehicle is in proximity to a wireless device comprises:
    determination means for making a determination by the first device associated with the vehicle that the first device is in proximity to the wireless device based on a signal from an image capture device.

6. The system of claim 4 wherein the determination means for making a determination that a first device associated with a vehicle is in proximity to a wireless device comprises:
    determination means for making a determination by the first device that the first device is in proximity to the wireless device based on a received wireless signal from the wireless device.

7. The system of claim 4 wherein the determination means for making a determination that a first device associated with a vehicle is in proximity to a wireless device comprises:
    means for determining that the first device coupled to the vehicle is in proximity to the wireless device without the wireless device touching the vehicle; and
    means for establishing a wireless communications link between the first device and the wireless device responsive to the means for determining that the first device coupled to the vehicle is in proximity to the wireless device without the wireless device touching the vehicle.

8. The system of claim 4 wherein the determination means for making a determination that a first device associated with a vehicle is in proximity to a wireless device comprises:
    means for receiving a radio frequency identification (RFID) signal from the wireless device.

9. The system of claim 8 wherein the processing means for performing an operation with respect to the vehicle based at least in part on the determination comprises:
    means for controlling the vehicle to perform a default operation responsive to the means for receiving the radio frequency identification (RFID) signal from the wireless device.

10. The system of claim 4 wherein the communication means for transmitting a signal from the first device to the wireless device to cause the wireless device to display information related to the vehicle comprises:
    communication means for transmitting a signal from the first device to the wireless device to cause the wireless device to display a menu of vehicle operations for the vehicle.

11. The system of claim 4 wherein the processing means for performing an operation with respect to the vehicle based at least in part on the determination comprises:
    means for actuating by the first device a door lock of the vehicle.

12. The system of claim 4 wherein the communication means for transmitting a signal from the first device to the wireless device to cause the wireless device to display information related to the vehicle comprises:
   communication means for transmitting the signal from the first device to the wireless device to cause the wireless device to display information identifying an operation that has been performed with respect to the vehicle.

13. The system of claim 4 wherein the processing means for performing an operation with respect to the vehicle based at least in part on the determination comprises:
   means for disabling a security system for the vehicle.

14. The system of claim 4 wherein the processing means for performing an operation with respect to the vehicle based at least in part on the determination comprises:
   means for performing, by the first device, a first non-default operation with respect to the vehicle responsive to means for receiving at the first device a signal from the wireless device corresponding to a user selection.

15. The system of claim 4 wherein the processing means for performing an operation with respect to the vehicle based at least in part on the determination comprises:
   means for executing, by the first device, a financial transaction relating to a product or service based at least in part on the determination.

16. The system of claim 4 wherein the processing means for performing an operation with respect to the vehicle based at least in part on the determination comprises:
   means for transmitting vehicle-related information from the first device to the wireless device.

17. The computer-readable medium of claim 1 wherein the one or more instructions for making a determination that a first device associated with a vehicle is in proximity to a wireless device comprise:
   one or more instructions for making a determination by the first device that the first device is in proximity to the wireless device based on a received wireless signal from the wireless device.

18. The computer-readable medium of claim 1 wherein the one or more instructions for making a determination that a first device associated with a vehicle is in proximity to a wireless device comprise:
   one or more instructions for determining of a touching between the wireless device and the vehicle; and
   one or more instructions for establishing a wireless communications link between the first device and the wireless device responsive to the one or more instructions for determining of the touching between the wireless device and the vehicle.

19. The computer-readable medium of claim 1 wherein the one or more instructions for making a determination that a first device associated with a vehicle is in proximity to a wireless device comprise:
   one or more instructions for determining that the first device coupled to the vehicle is in proximity to the wireless device without the wireless device touching the vehicle; and
   establishing a wireless communications link between the first device and the wireless device responsive to the one or more instructions for determining that the first device coupled to the vehicle is in proximity to the wireless device without the wireless device touching the vehicle.

20. The computer-readable medium of claim 1 wherein the one or more instructions for making a determination that a first device associated with a vehicle is in proximity to a wireless device comprise:
   one or more instructions for receiving a radio frequency identification (RFID) signal from the wireless device.

21. The computer-readable medium of claim 20 wherein the one or more instructions for performing an operation with respect to the vehicle based at least in part on the determination comprise:
   one or more instructions for controlling the vehicle to perform a default operation responsive to the one or more instructions for receiving the radio frequency identification (RFID) signal from the wireless device.

22. The computer-readable medium of claim 1 wherein the one or more instructions for transmitting a signal from the first device to the wireless device to cause the wireless device to display information related to the vehicle comprise:
   one or more instructions for transmitting a signal from the first device to the wireless device to cause the wireless device to display a menu of vehicle operations for the vehicle.

23. The computer-readable medium of claim 1 wherein the one or more instructions for performing an operation with respect to the vehicle based at least in part on the determination comprise:
   one or more instructions for performing by the first device a first default operation with respect to the vehicle responsive to the one or more instructions for making the determination that the first device associated with the vehicle is in proximity to the wireless device.

24. The computer-readable medium of claim 1 wherein the one or more instructions for performing an operation with respect to the vehicle based at least in part on the determination comprise:
   one or more instructions for actuating by the first device a door lock of the vehicle.

25. The computer-readable medium of claim 1 wherein the one or more instructions for performing an operation with respect to the vehicle based at least in part on the determination comprise:
   one or more instructions for controlling, by the first device, an ignition system on the vehicle based at least in part on the determination.

26. The computer-readable medium of claim 1 wherein the one or more instructions for performing an operation with respect to the vehicle based at least in part on the determination comprise:
   one or more instructions for controlling, by the first device, the vehicle to perform an operation with respect to one or more of a security system, a lock system, an air conditioning system, a heating system, an audio system or a video system for the vehicle based at least in part on the determination.

27. The computer-readable medium of claim 1 wherein the one or more instructions for performing an operation with respect to the vehicle based at least in part on the determination comprise:
   one or more instructions for controlling, by the first device, the vehicle to perform an operation with respect to one or more of a navigation system, an information system, an ignition system, a lighting control system, a communication system, a driver settings system, or a user customization system for the vehicle based at least in part on the determination.

28. The computer-readable medium of claim 1 wherein the one or more instructions for performing an operation with respect to the vehicle based at least in part on the determination comprise:
   one or more instructions for receiving a signal at the first device from the wireless device; and one or more instructions for performing, by the first device, an operation with respect to one or more of a security system, a lock system, an air conditioning system, a heating system, an audio system, a video system, a navigation system, an information system, an ignition system, a lighting control system, a communication system, a driver settings system, or a user customization system for the vehicle responsive to the one or more instructions for receiving the signal at the first device from the wireless device.

29. The computer-readable medium of claim 1 wherein the one or more instructions for transmitting a signal from the first device to the wireless device to cause the wireless device to display information related to the vehicle comprise:
one or more instructions for transmitting a signal from the first device to the wireless device to cause the wireless device to display information identifying an operation that has been performed with respect to the vehicle.

30. The computer-readable medium of claim 1 wherein the one or more instructions for performing an operation with respect to the vehicle based at least in part on the determination comprise:
one or more instructions for disabling a security system for the vehicle.

31. The computer-readable medium of claim 1 wherein the one or more instructions for performing an operation with respect to the vehicle based at least in part on the determination comprise:
one or more instructions for performing, by the first device, a first non-default operation with respect to the vehicle in response to receiving at the first device a signal from the wireless device corresponding to a user selection.

32. The computer-readable medium of claim 1 wherein the one or more instructions for performing an operation with respect to the vehicle based at least in part on the determination comprises:
one or more instructions for executing, by the first device, a financial transaction relating to a product or service.

33. The computer-readable medium of claim 1 wherein the one or more instructions for performing an operation with respect to the vehicle based at least in part on the determination comprises:
one or more instructions for executing, by the first device, a financial transaction relating to the vehicle based on receiving a signal from the wireless device corresponding to a user selection provided at the wireless device.

34. The computer-readable medium of claim 1 wherein the one or more instructions for performing an operation with respect to the vehicle based at least in part on the determination comprises:
one or more instructions for transmitting vehicle-related information from the first device to the wireless device.

35. The computer-readable medium of claim 1 wherein the one or more instructions for performing an operation with respect to the vehicle based at least in part on the determination comprises:
one or more instructions for receiving, at the first device, a trip configuration from the wireless device.

* * * * *